*(12)* United States Patent
Tout et al.

(10) Patent No.: US 10,163,049 B2
(45) Date of Patent: Dec. 25, 2018

(54) INCONSPICUOUS TAG FOR GENERATING AUGMENTED REALITY EXPERIENCES

(71) Applicant: Microsoft Technology Licensing, LLC, Redmond, WA (US)

(72) Inventors: Nigel David Tout, Woodinville, WA (US); Aditya Goteti, Issaquah, WA (US); Jack Clevenger, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 769 days.

(21) Appl. No.: 13/789,943

(22) Filed: Mar. 8, 2013

(65) Prior Publication Data

US 2014/0253589 A1   Sep. 11, 2014

(51) Int. Cl.
*G06K 19/06* (2006.01)

(52) U.S. Cl.
CPC ... *G06K 19/0614* (2013.01); *G06K 19/06046* (2013.01); *G06K 19/06159* (2013.01)

(58) Field of Classification Search
USPC ........................................................ 235/492
See application file for complete search history.

(56) References Cited

U.S. PATENT DOCUMENTS

| 4,683,371 | A | 7/1987 | Drexler |
| 6,324,004 | B1 | 11/2001 | Staub et al. |
| 7,002,551 | B2 | 2/2006 | Azuma et al. |
| 7,064,742 | B2 | 6/2006 | Navab et al. |
| 8,430,310 | B1* | 4/2013 | Ho .......................... G06F 21/35 235/382 |
| 8,767,014 | B2* | 7/2014 | Vaught ................. G02B 27/017 345/633 |
| 8,836,768 | B1* | 9/2014 | Rafii ....................... G06F 3/017 345/420 |
| 2004/0002496 | A1 | 1/2004 | Bebbington et al. |
| 2008/0191846 | A1* | 8/2008 | Chang .................... G01S 3/046 340/10.41 |
| 2011/0018903 | A1 | 1/2011 | Lapstun et al. |

(Continued)

FOREIGN PATENT DOCUMENTS

| EP | 1798670 A1 | 6/2007 |
| WO | 2011/076200 A1 | 6/2011 |

OTHER PUBLICATIONS

International Search Report & Written Opinion dated Oct. 20, 2014, in PCT Patent Application No. PCT/US2014/020818 filed Mar. 5, 2014.

(Continued)

*Primary Examiner* — Michael G Lee
*Assistant Examiner* — David Tardif
(74) *Attorney, Agent, or Firm* — Jacob P. Rohwer; Newport IP, LLC

(57) ABSTRACT

A system and method for generating virtual objects, the data for the virtual object is retrieved at least in part from a tag. The tag comprises a transparent physical surface and a visually imperceptible structure constructed in the transparent physical surface. The tag encodes the data for the virtual objects in the visually imperceptible structure. When detected by the appropriately configured capture devices, the visually imperceptible structure produces a depth pattern that is reflected in phase shifts between regions in the tag.

20 Claims, 21 Drawing Sheets

(56) References Cited

U.S. PATENT DOCUMENTS

| | | | |
|---|---|---|---|
| 2012/0197519 A1* | 8/2012 | Richardson | G01C 21/20 701/408 |
| 2012/0241515 A1 | 9/2012 | Freeman | |
| 2012/0244939 A1 | 9/2012 | Braun | |
| 2013/0038510 A1 | 2/2013 | Brin et al. | |
| 2013/0044042 A1 | 2/2013 | Olsson et al. | |
| 2014/0002496 A1* | 1/2014 | Lamb | G06F 3/14 345/633 |

OTHER PUBLICATIONS

Ryu, et al., "Implementation of Augmented Reality System using the Infrared Rays LED Marker based on Hybrid Tracking", In International Proceedings of Computer Science and Information Technology, vol. 13, Sep. 2011, 6 pages.

Kangas, et al., "Using Code Mobility to Create Ubiquitous and Active Augmented Reality in Mobile Computing", In Proceedings of the 5th Annual ACM/IEEE International Conference on Mobile Computing and Networking, Aug. 15, 1999, 11 pages.

Nota, et al., "Augmenting Real-world Objects by Detecting "Invisible" Visual Markers", In Proceedings of the 21th Annual ACM Symposium on User Interface Software and Technology, Oct. 19, 2008, 2 pages.

Starner, et al., "Augmented Reality Through Wearable Computing", In the Journal of Presence: Teleoperators and Virtual Environments, vol. 6, No. 3, Aug. 1997, 24 pages.

"Capturing Photos and Videos with Tagged Pixels", Published on: Jun. 23, 2010, Available at: http://www1.cs.columbia.edu/CAVE/projects/photo_tags/.

"First Office Action and Search Report Issued in Chinese Patent Application No. 201480012966.5", dated May 16, 2017, 16 Pages.

"Office Action Issued in European Patent Application No. 14713321.9", dated Sep. 7, 2017, 3 Pages.

Response to Office Action, with English translation of claims as amended, filed Sep. 29, 2017 in Chinese Patent Application No. 201480012966.5, 11 Pages.

* cited by examiner

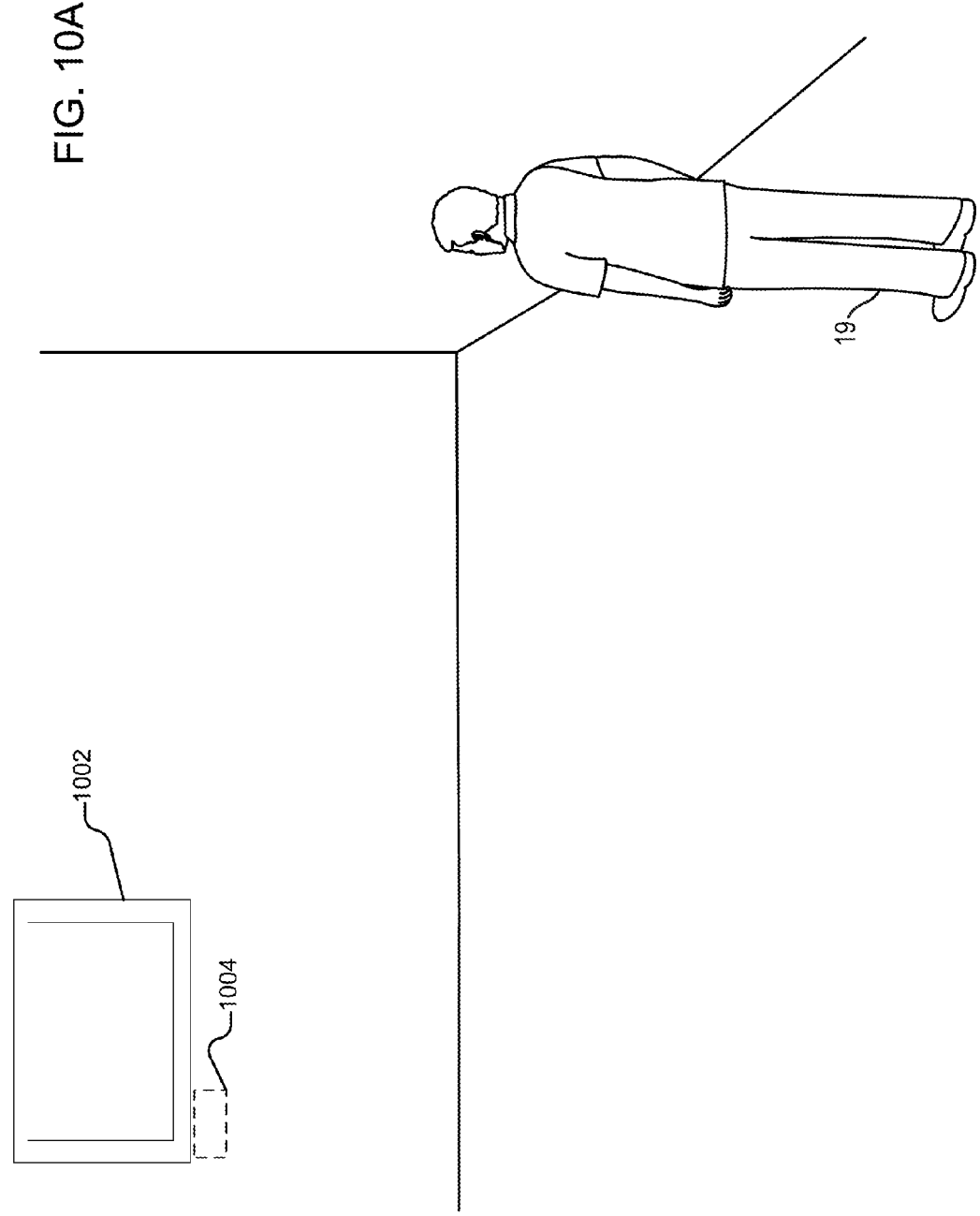

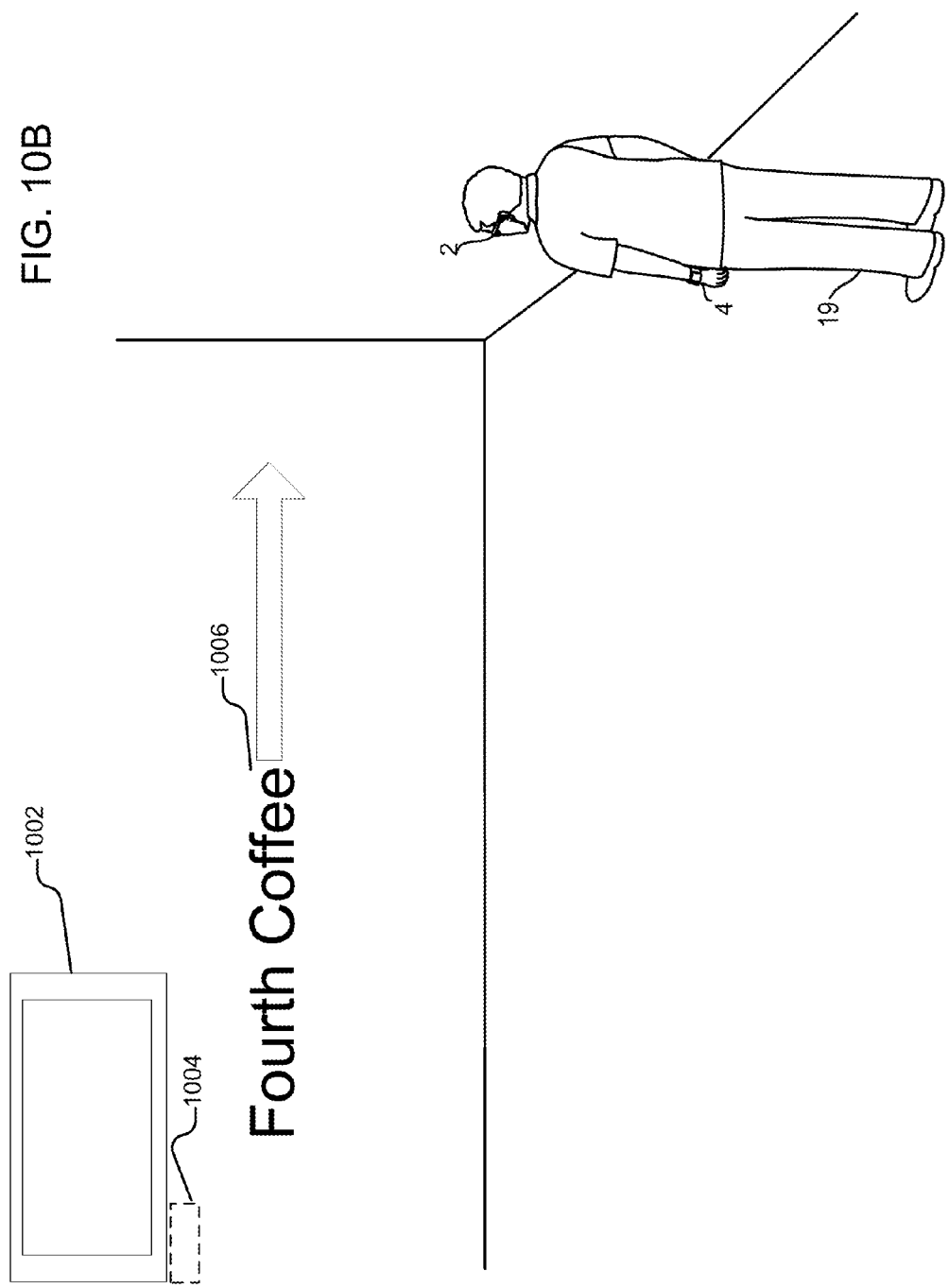

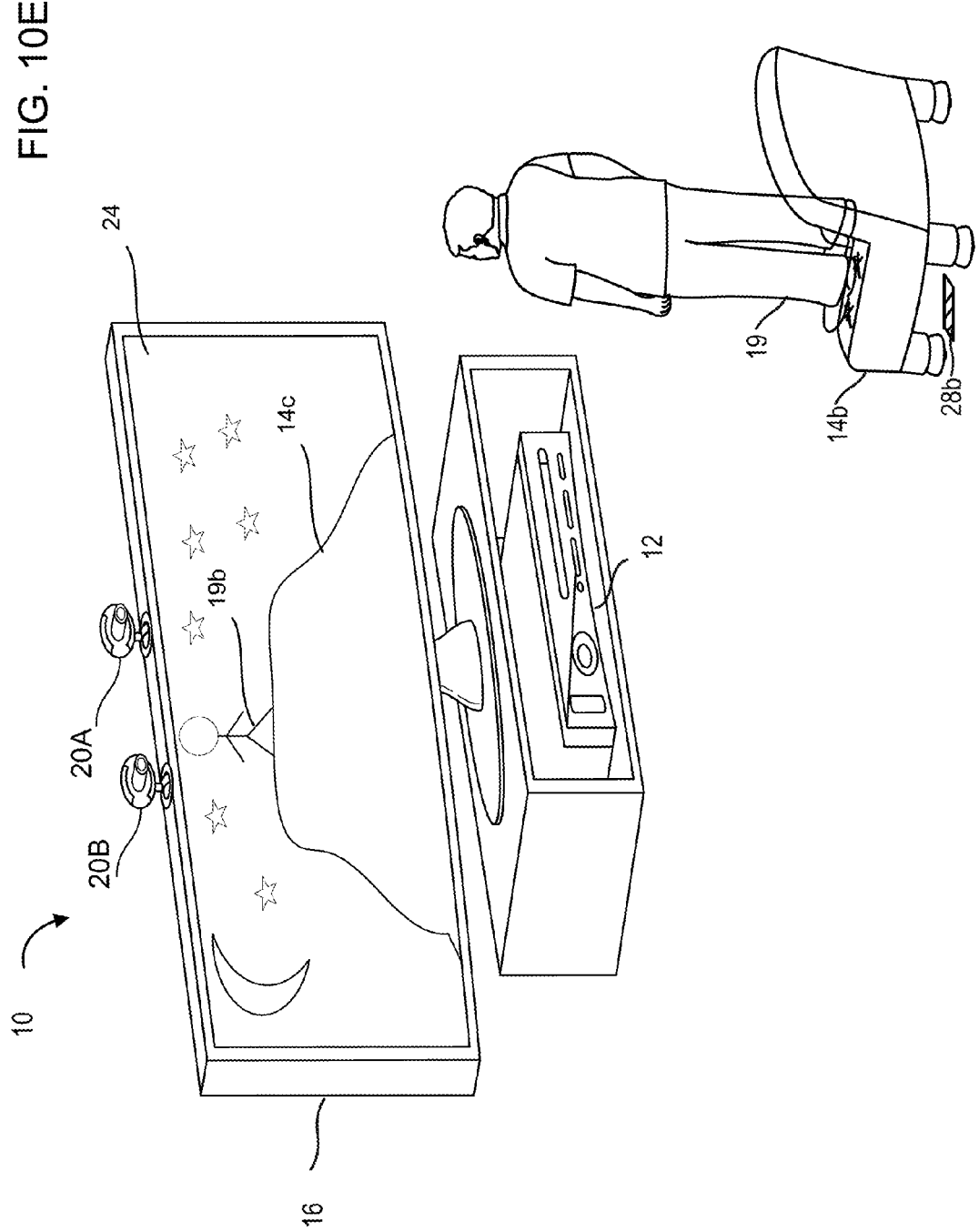

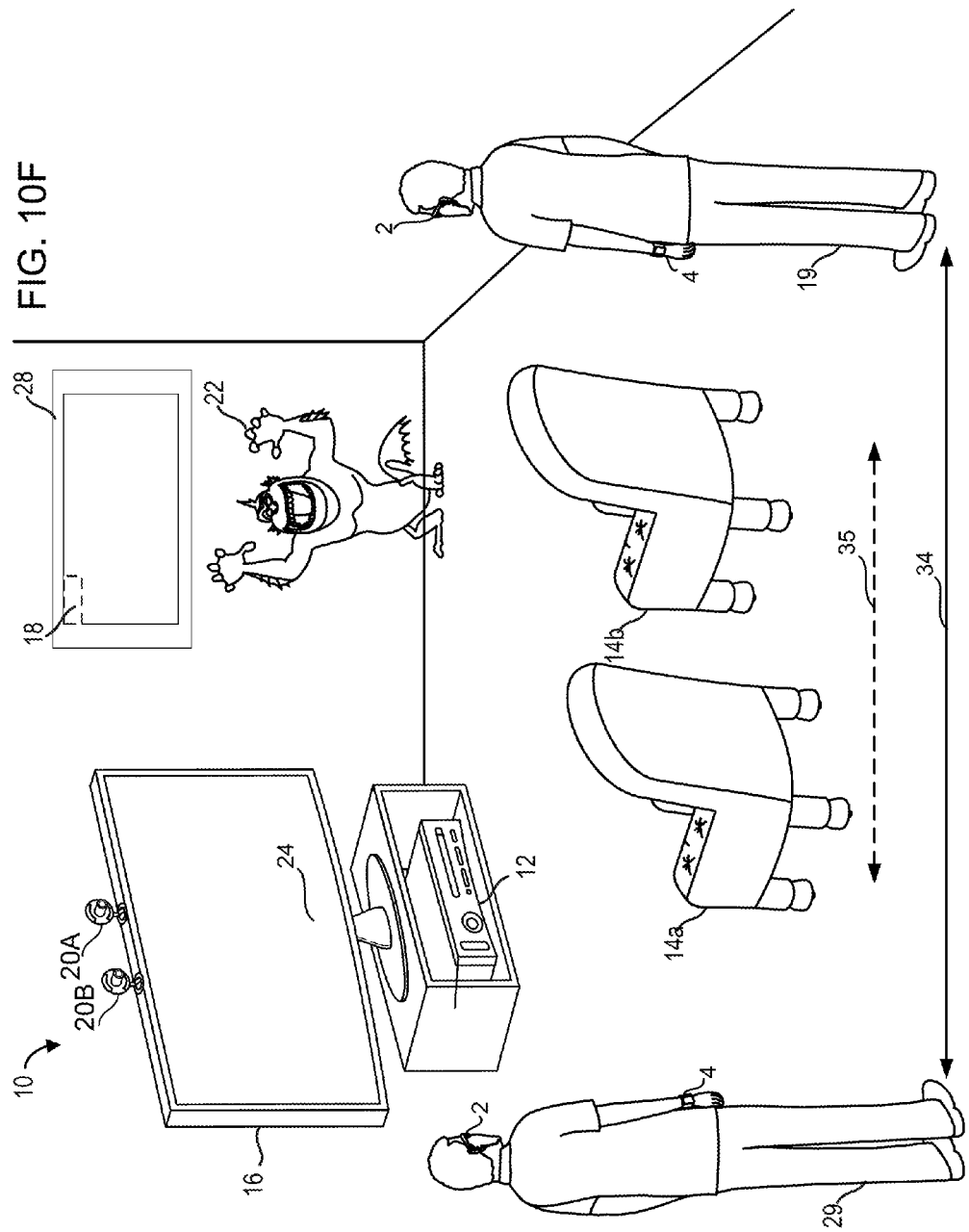

INCONSPICUOUS TAG FOR GENERATING AUGMENTED REALITY EXPERIENCES

BACKGROUND OF THE TECHNOLOGY

Augmented reality is a technology that allows virtual imagery to be mixed with a user's actual view of the real world. A see-through, near-eye augmented reality display may be worn by a user to view the mixed imagery of virtual and real objects. The display presents virtual imagery in the user's field of view. A see-through, near-eye augmented reality display is a type of head-mounted display (HMD).

Alternatively, an augmented reality system may comprise a stationary system that includes the ability to capture information, such as visual information, about the user and the user's surrounding environment. The augmented reality system can then represent this information back to the user, for example, by displaying captured visual data of the user and the surrounding environment on a display device. The augmented reality system may overlay the displayed information with other information either generated by the system internally or retrieved by the system externally from another source.

DESCRIPTION OF THE DRAWINGS

FIGS. 10A-F show examples of the disclosed technology in use.

DETAILED DESCRIPTION

Figure 1:
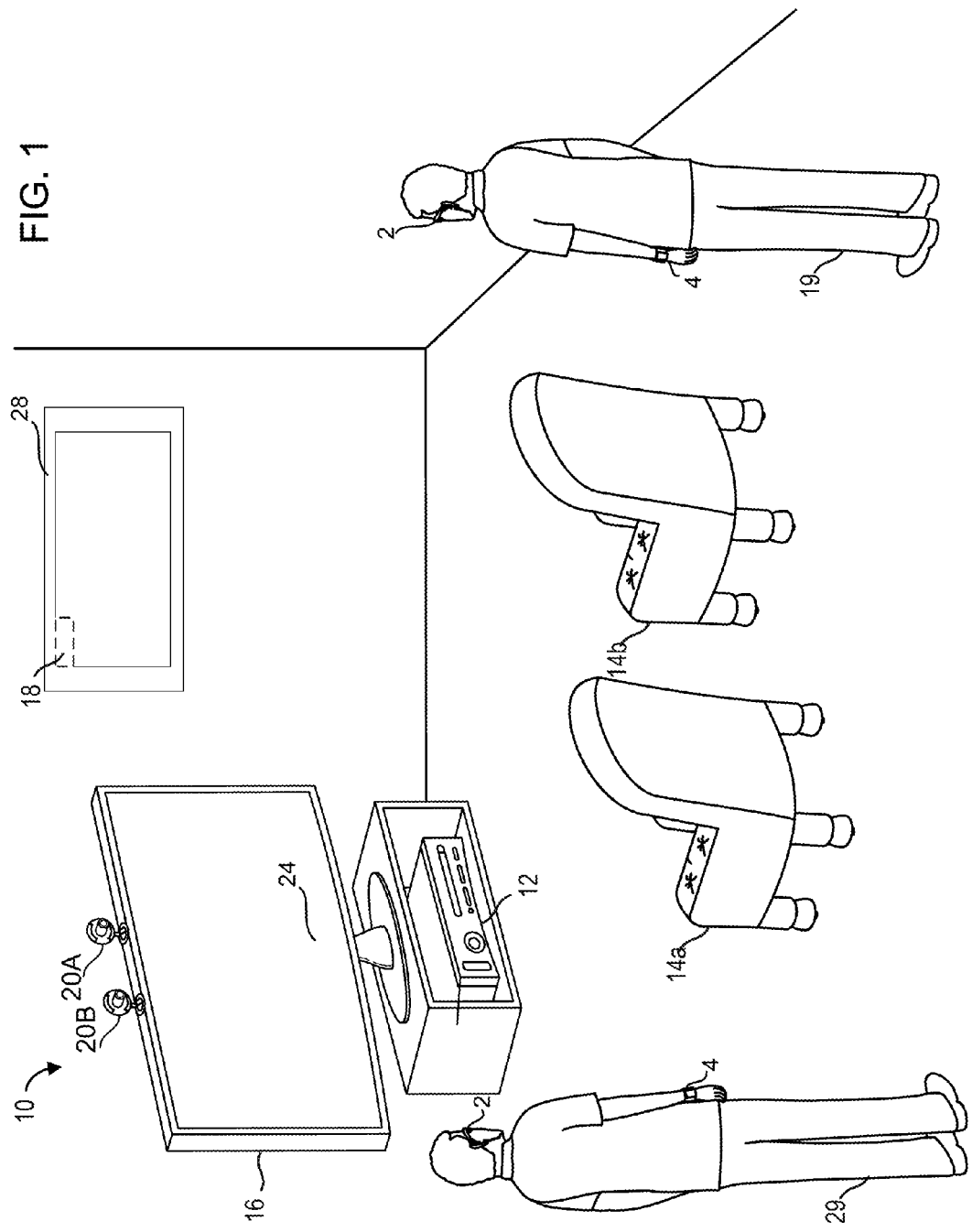
FIG. 1 shows an example scenario in which the disclosed technology may be used.

Augmented reality systems are equipped with the ability to represent the real world alongside virtual objects, to the user. In some cases, the system may decide what virtual objects to represent, and how to represent this virtual objects, based on information the system receives from the environment, such as real-world objects or patterns within view of the augmented reality system's information capturing apparatus, which may include sensors, cameras, microphones, and the like. Described below is a technology in which an augmented reality system is able to detect a certain kind of optically inconspicuous object (known hereinafter as a "tag") in its visual field, and display virtual information based on the information obtained from the tag.

Generally, the tag that is read by the augmented reality system will be optically inconspicuous. To this end, the tag may have properties such as small size (i.e. dimensions on the order of a postage stamp) and/or transparency with respect to the visible spectrum. In one embodiment, the augmented reality system may make use of technology such as a depth camera to read information data on the tag. The tag may take the form of a sticker that can be scanned by infrared light, and this sticker may in turn be placed in various locations that a user of the augmented reality system is able to find using the augmenting reality system. The tag may have a pattern of materials such that each material introduces a specific phase change to infrared light upon reflecting incident infrared (or another invisible wavelength) light. Alternatively, the pattern of a tag may be composed of a single layer separated into regions, which define the pattern on the tag. This single layer may consist of materials such as zirconium dioxide, titanium, and gold, which may be assembled into a reflective structure. The phase shift introduced to reflected IR light by each region may depend on the size of the region. By exposing the tag to a light source and sensing the reflected light, the augmented reality system can detect the varying phase changes resulting from the pattern on the tag as a depth pattern.

This depth pattern may be two or three dimensions, such that one of the dimensions is depth. The pattern on the tag, which an augmented reality system senses as a pattern defined by phase changes in the reflected depth measurement, may encode data which can be read and interpreted by the augmented reality system. The data encoded by the tag may be instructions to the augmented reality system to retrieve further instructions from an external database that can be accessed via an internet or other kind of network connection.

Once data has been gathered from the tag, as well as from any additional sources to which the tag refers, such as a database or server, the system will display one or more virtual objects corresponding to this data. These virtual objects will be displayed i relative to features or objects of the physical environment. In one embodiment, the virtual objects are superimposed on a view of the physical environment via a head-mounted display (HMD), which is described in further detail in FIGS. 2-4. Alternatively, the virtual objects maybe shown on a display which also shows an image of the physical environment and the objects and features thereof. In some settings, such as in a video game, the image of the physical environment may be lightly or heavily modified (see FIG. 10E) to match the context of the setting.

In augmented reality applications, the tag can play a variety of roles, some of which will be discussed in more detail below. In these examples, it is assumed that the tag and surrounding area are being or have been viewed through the appropriate augmented reality equipment. For example, when placed on or near a picture frame, the tag can ensure that the picture frame serves as a television screen. On a blank notepad surface, a tag can create a screen with which a user can interact as the user might with a tablet computer. On a business card, the tag can provide additional textual or visual information about the person or company named in the business card, such that this information is overlaid on or in an area near the image of the business card. On a wall inside or outside a building, the tag may produce an animated advertisement with accompanying sound that is audible to the augmented reality system user through head-phones. Additionally, the content of the advertisement seen by the user may be tailored to the individual user if the augmented reality system has access to additional information such as the user's social network profile.

Embodiments will now be described with reference to drawings enclosed with this document.

FIG. 1 depicts a common scenario in which the disclosed technology may be used. FIG. 1 discloses various types of hardware which may be used by users 19 and 29 in accordance with the present technology. In one case, the technology may comprise gaming system and cameras along with display 16. In another embodiment, it may comprise an HMD device worn by the users. It should be understood these can be used alone or in conjunction with other types of mixed reality devices . . . . In a living room, users 29 and 19 play a video game, making use of a gaming console 12 and television set 16.

In the example, users 19 and 29 are in a living room as indicated by the entertainment system 10 (in this case, composed of television set 16, gaming console 12, and cameras 20A and 20B) and chairs 14a and 14b. Each user is wearing a see-through, augmented reality display device system comprising, in this example the head-mounted display device 2 as a pair of eyeglasses, as well as a processing unit 4 on the wrist. The display 24 shows some of what each of users 19 and 29 is currently looking at through his head-mounted display device 2, but a person who walks in the living room without the HMD may not see at least some information on these display views. Users 29 and 19 see through their display devices images corresponding to events in the game they are playing. In one embodiment in which the console is executing all or part of a game which is rendering some or all of the visuals for the game on display 24, the content shown on display 24 may depend on one or both of the software running on gaming console 12 and the information captured by cameras 20A and 20B, which may capture the motions, gestures, or facial expressions of users 19 and 29, as well as other features within the field of view of cameras 20A and 20B. More detail will be provided below.

Also present in the living room and gaming scenario is picture frame 28, part of which is covered by tag 18. As will be explained in greater detail below, tag 18 plays an important role in providing an augmented reality aspect to the gaming experience of users 19 and 29. The choice of the shape, dimensions, and position of the tag, as well as the choice of the picture frame as the exemplary object with which the tag is associated, are purely for the purpose of illustration.

Figure 2:
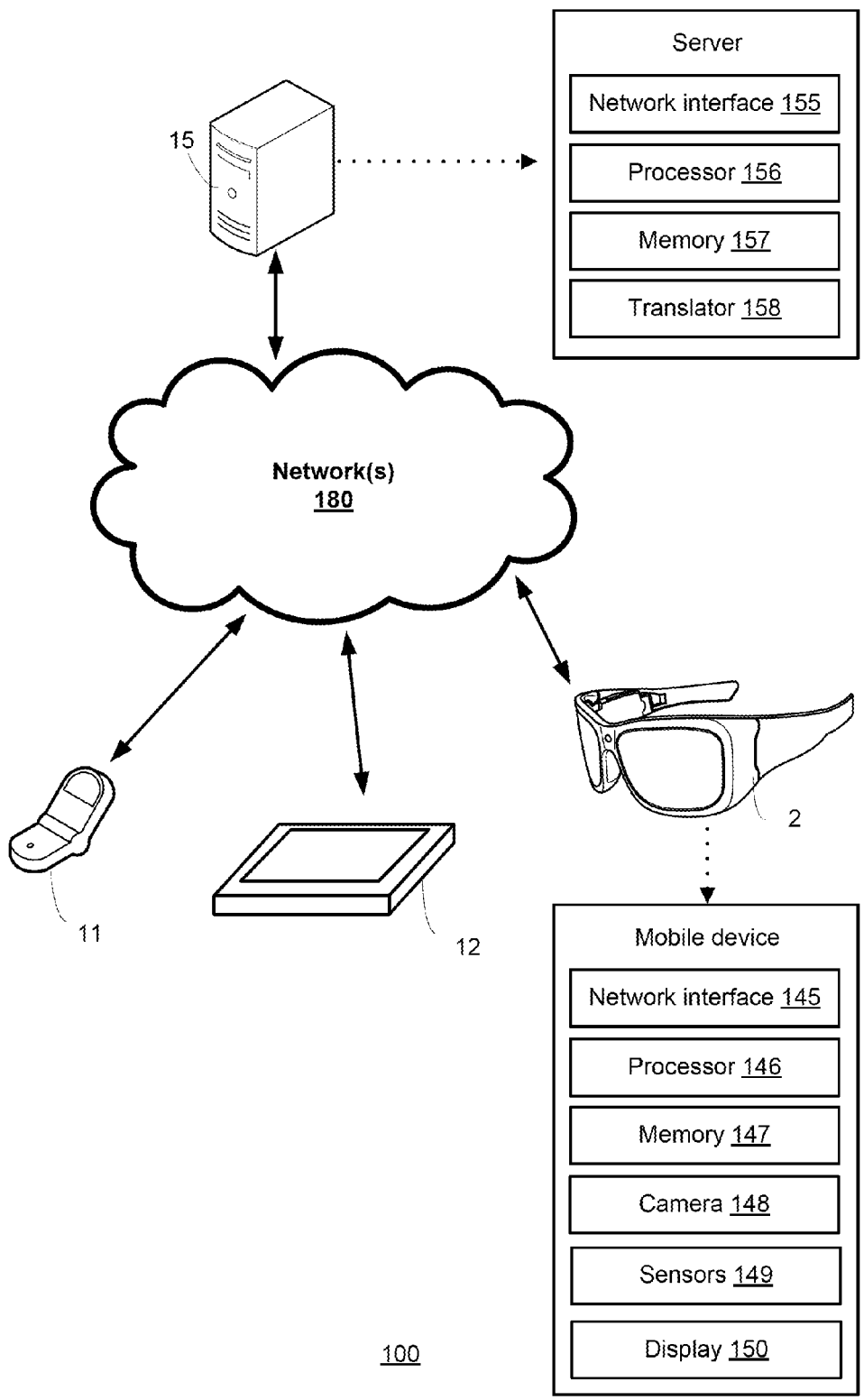
FIG. 2 is a block diagram of one embodiment of a networked computing environment in which the disclosed technology may be practiced.

FIG. 2 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, m head-mounted display device (one embodiment of which may incorporate processing unit 4 of FIG. 1), and server 15. In some embodiments, the plurality of computing devices may include other computing devices not shown. In some embodiments, the plurality of computing devices may include more than or less than the number of computing devices shown in FIG. 2. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of head-mounted display device 2 includes a network interface 145, processor 146, memory 147, camera 148, sensors 149, and display 150, all in communication with each other. Network interface 145 allows head-mounted display device 2 to connect to one or more networks 180. Network interface 145 may include a wireless network interface, a modem, and/or a wired network interface. Processor 146 allows head-mounted display device 2 to execute computer readable instructions stored in memory 147 in order to perform processes discussed herein. Camera 148 may capture color images and/or depth images. Sensors 149 may generate motion and/or orientation information associated with head-mounted display device 2. In some cases, sensors 149 may comprise an inertial measurement unit (IMU). Display 150 may display digital images and/or videos. Display 150 may comprise a see-through display.

In some embodiments, various components of head-mounted display device 2 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, head-mounted display device 2 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, head-mounted display device 2 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on head-mounted display device 2 (i.e., on the client side). The virtual objects may include a text description associated with a real-world object.

In some embodiments, a mobile device, such as head-mounted display device 2, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the head-mounted display device 2 may specify a particular file format for receiving the one or more virtual objects and server 15 may transmit to the head-mounted display device 2 the one or more virtual objects embodied within a file of the particular file format.

Figure 3A:
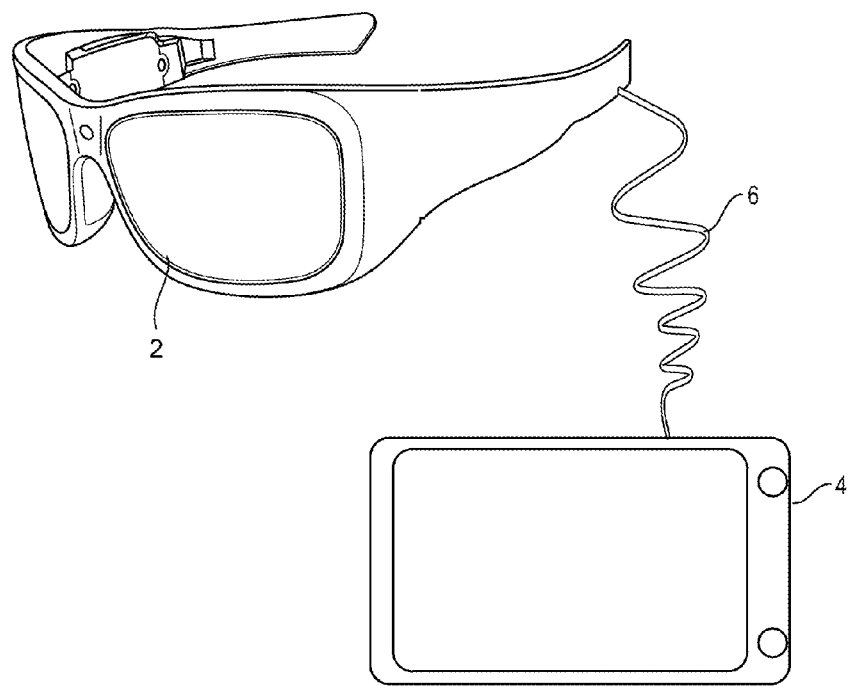
FIGS. 3A-C depict embodiments of an exemplary head-mounted display (HMD) configured to perform the disclosed technology.

FIG. 3A depicts one embodiment of an HMD device 2 in communication with processing unit 4. HMD device 2 may comprise see-through eyeglasses with additional electronics configured to perform the disclosed technology. As depicted, HMD device 2 communicates with processing unit 4 via a wired connection 6. However, the HMD device 2 may also communicate with processing unit 4 via a wireless connection. Processing unit 4 may be used by HMD device 2 in order to offload compute intensive processing tasks (e.g., the rendering of virtual objects) and to store virtual object information and other data that may be used to provide an augmented reality environment on HMD device 2.

Figure 3B:
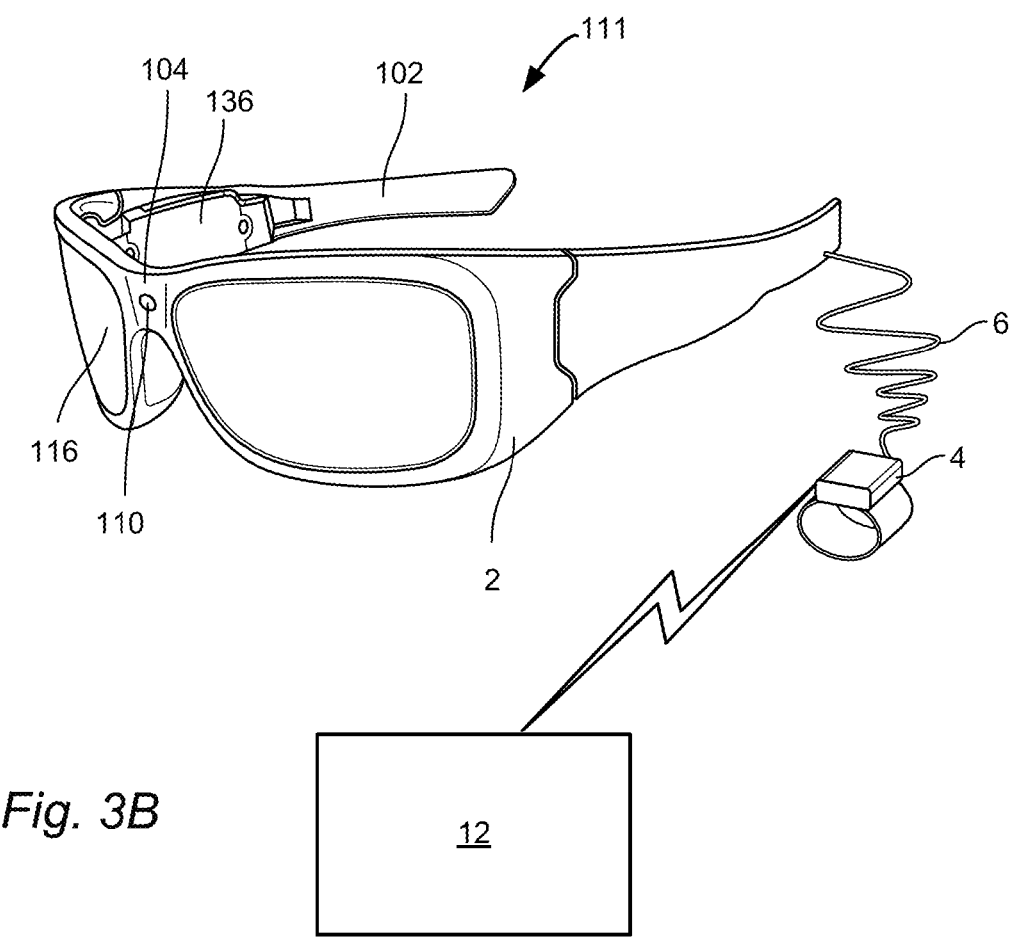

FIG. 3B shows further details of one embodiment of an HMD system 111. The HMD system 111 includes an HMD device 2 in communication with processing unit 4 via wire 6. In other embodiments, HMD device 2 communicates with processing unit 4 via wireless communication. Note that the processing unit 4 could be integrated into the HMD device 2. In one embodiment, processing unit 4 takes the form of a wrist-mounted computer, as shown in FIG. 2. Head-mounted display device 2, which in one embodiment is in the shape of glasses, including a frame with see-through lenses, is carried on the head of a person so that the person can see through a display and thereby see a real-world scene which includes an image which is not generated by the HMD device. More details of the HMD device 2 are provided below.

In one embodiment, processing unit 4 is carried on the user's wrist and includes much of the computing power used to operate HMD device 2. Processing unit 4 may communicate wirelessly (e.g., using WIFI®, Bluetooth®, infrared (e.g., IrDA or Infrared Data Association standard), or other wireless communication means) to one or more hub computing systems 12.

In one embodiment, hub computing system 12 may include a processor such as a standardized processor, a specialized processor, a microprocessor, or the like that may execute instructions stored on a processor readable storage device for performing the processes described herein. Hub computing system may comprise gaming console 12 of FIG. 1 or one or more of the systems participating in network 180 of FIG. 2.

Processing unit 4 and/or hub computing device 12, may be used to recognize, analyze, and/or track human (and other types of) targets. For example, the position of the head of the person wearing HMD device 2 may be tracked to help determine how to present virtual images in the HMD 2.

Figure 3C:
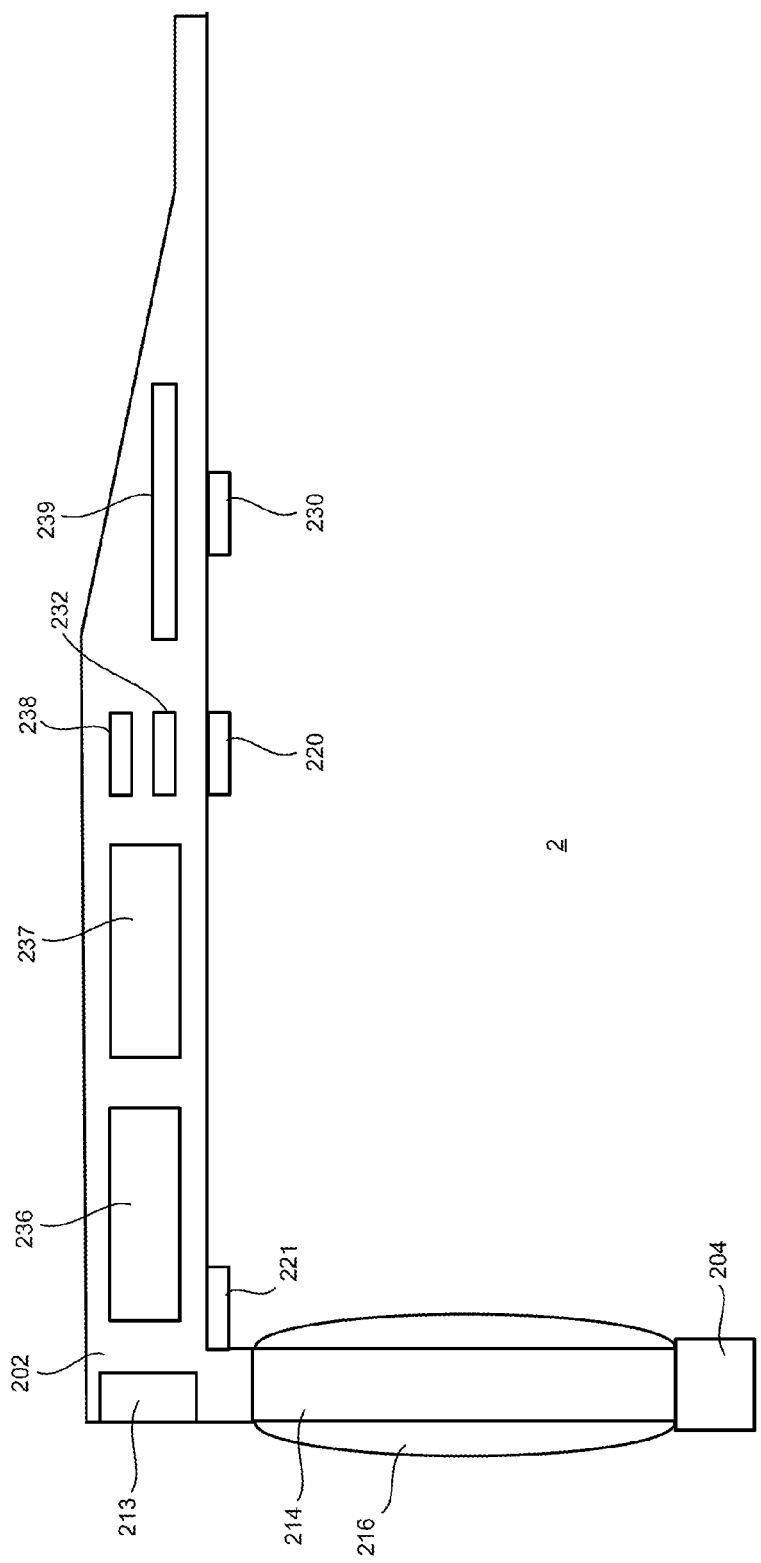

FIG. 3C depicts one embodiment of a portion of an HMD, such as head-mounted display device 2 in FIG. 1. Only the right side of an HMD 2 is depicted. HMD 2 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 2 and a temperature sensor for determining a body temperature associated with the end user of HMD 2. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 2 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 2 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 4A:
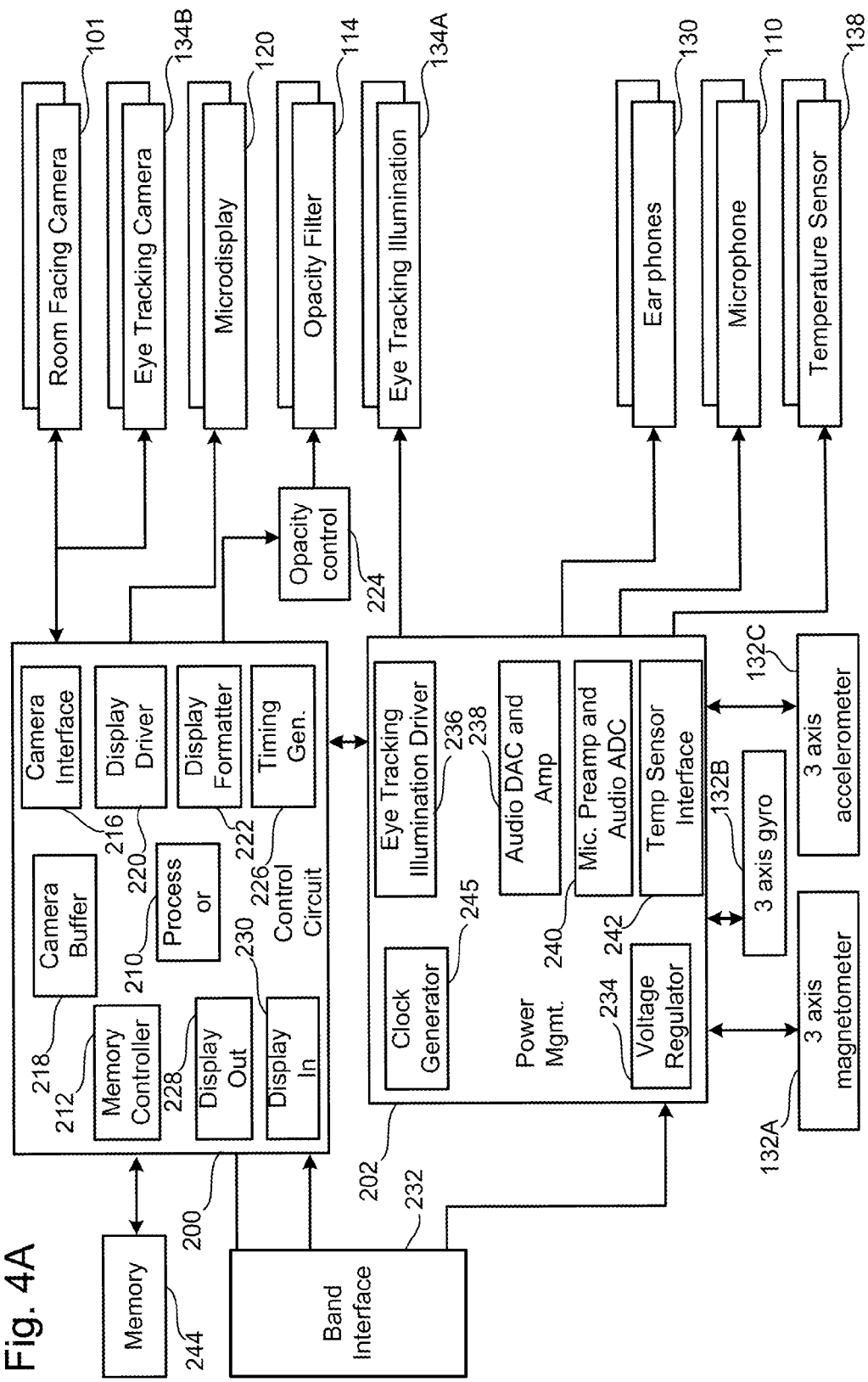
FIGS. 4A-B are block diagrams showing various components of an exemplary HMD and the functional connections of these components.
Figure 4B:
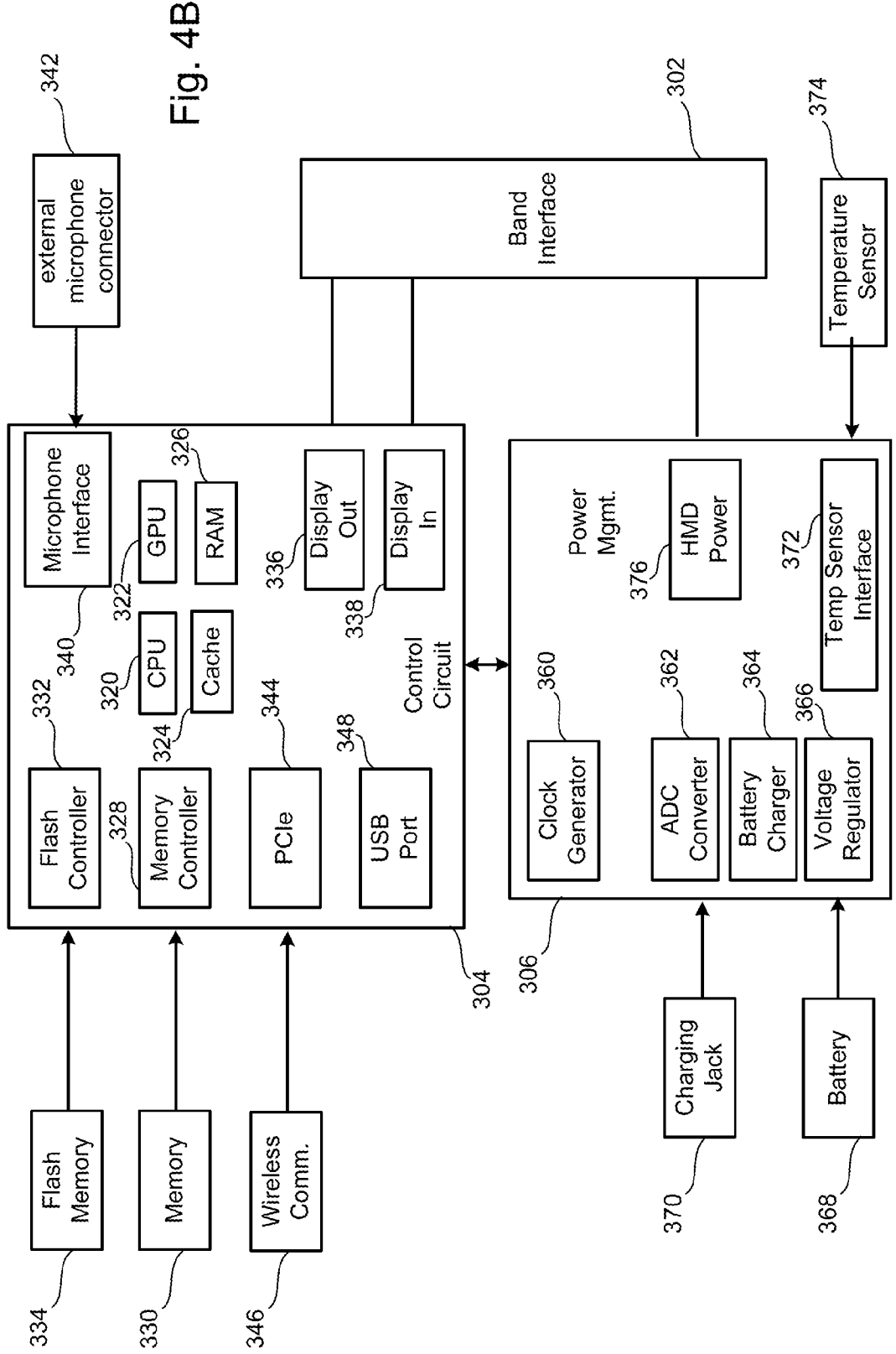

FIG. 4A is a block diagram depicting the various components of one embodiment of HMD device 2. FIG. 4B is a block diagram describing the various components of one embodiment of processing unit 4. Note that in some embodiments, the various components of the HMD device 2 and the processing unit 4 may be combined in a single electronic device. Additionally, the HMD device components of FIG. 4A include many sensors that track various conditions. Head-mounted display device may receive images from processing unit 4 and may provide sensor information back to processing unit 4. Processing unit 4, the components of which are depicted in FIG. 4A, may receive the sensory information from HMD device 2 and also from hub computing device 12.

Note that some of the components of FIG. 4A (e.g., room facing camera 101, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of HMD device. Regarding the room-facing camera 101, in one approach one camera is used to obtain images using visible light. In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12.

FIG. 4A shows the control circuit 200 in communication with the power management circuit 202. Control circuit 200 includes processor 210, memory controller 212 in communication with memory 244 (e.g., DRAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 112 and stores images received from the room facing cameras in camera buffer 218. Display driver 220 drives microdisplay 120. Display formatter 222 provides information, about the images being displayed on microdisplay 120, to opacity control circuit 224, which controls opacity filter 114. Timing generator 226 is used to provide timing data for the system. Display out interface 228 is a buffer for providing images from room facing cameras 112 to the processing unit 4. Display in 230 is a buffer for receiving images to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 245. Voltage regulator 234 receives power from processing unit 4 via band interface 232 and provides that power to the other components of HMD device 2. Eye tracking illumination driver 236 provides the infrared (IR) light source for eye tracking illumination 134A, as described above. Audio DAC and amplifier 238 receive the audio information from earphones 130. Microphone preamplifier and audio ADC 240 provide an interface for microphone 110. Temperature sensor interface 242 is an interface for temperature sensor 138. Power management unit 202 also provides power and receives data back from three-axis magnetometer 132A, three-axis gyroscope 132B and three axis accelerometer 132C.

FIG. 4B is a block diagram describing the various components of processing unit 4. Control circuit 304 is in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with HMD device 2 via band interface 302 and band interface 232, display in buffer 338 in communication with HMD device 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication component 346 can include a WIFI® enabled communication device, Bluetooth communication device, infrared communication device, etc. The wireless communication component 346 is a wireless communication interface which, in one implementation, receives data in synchronism with the content displayed by the video display screen.

The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to render virtual images in the HMD.

Power management circuit 306 includes clock generator 360, analog to digital converter 362, battery charger 364, voltage regulator 366, HMD power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the HMD device 2.

Figure 5:
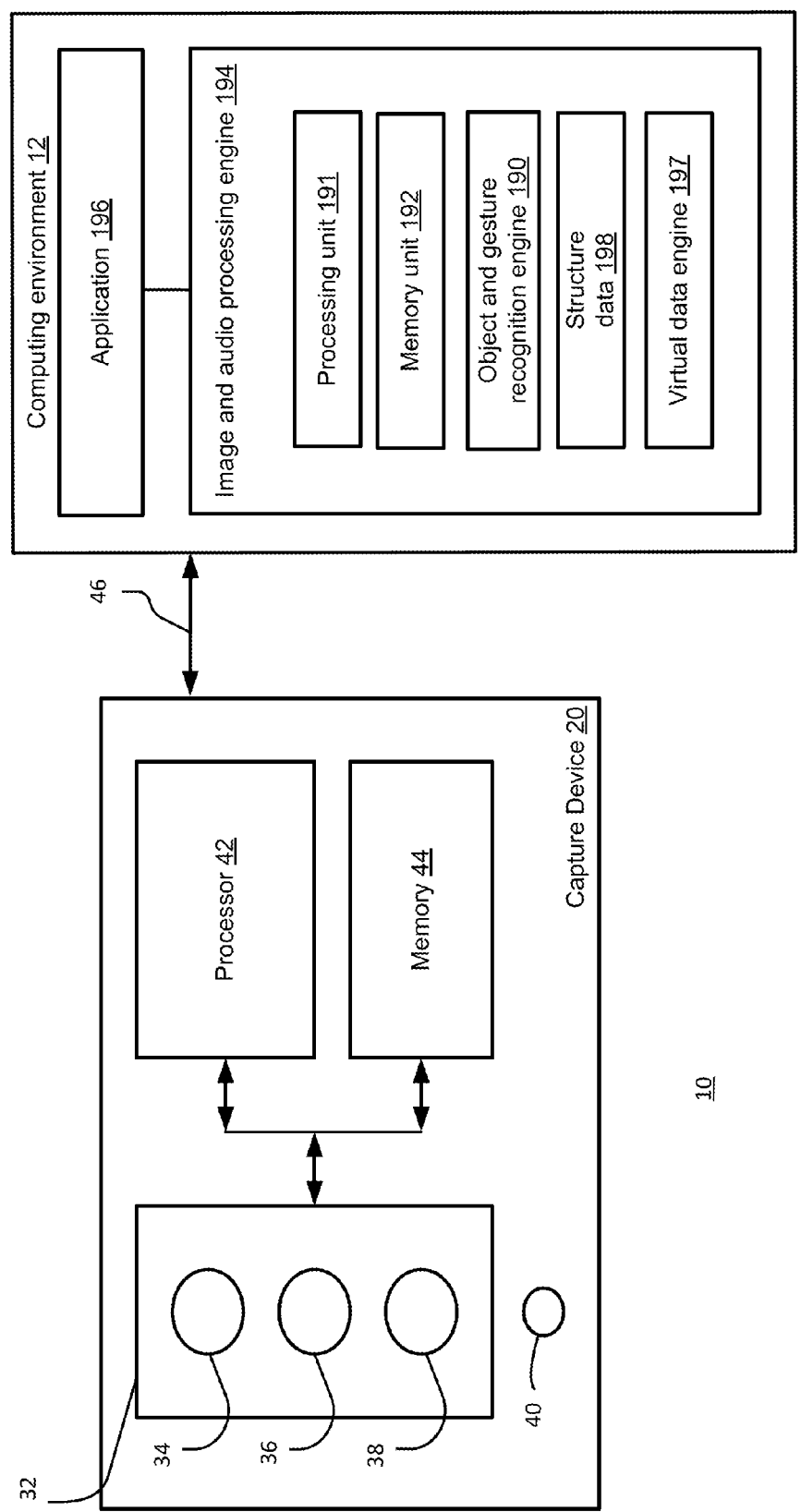
FIG. 5 depicts one embodiment of a computing device configured to perform the disclosed technology.

FIG. 5 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as head-mounted display device 2 in FIG. 2. In one example, the capture device 20 and computing environment 12 may be integrated within an HMD. In other embodiments, capture device 20 may be integrated with a first mobile device, such as head-mounted display device 2 in FIG. 3A, and computing environment 12 may be integrated with a second device in communication with the first mobile device, such as processing unit 4 in FIG. 3A. In another embodiment, capture device does not need to be integrated with head-mounted display device 2.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the image camera component 32.

The image camera component 32 may include an IR light component 34, a three-dimensional (3D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 5, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 5, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking Planar reference images, coded AR markers, QR codes, and/or bar codes may also be used to improve object detection and/or tracking Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 6:
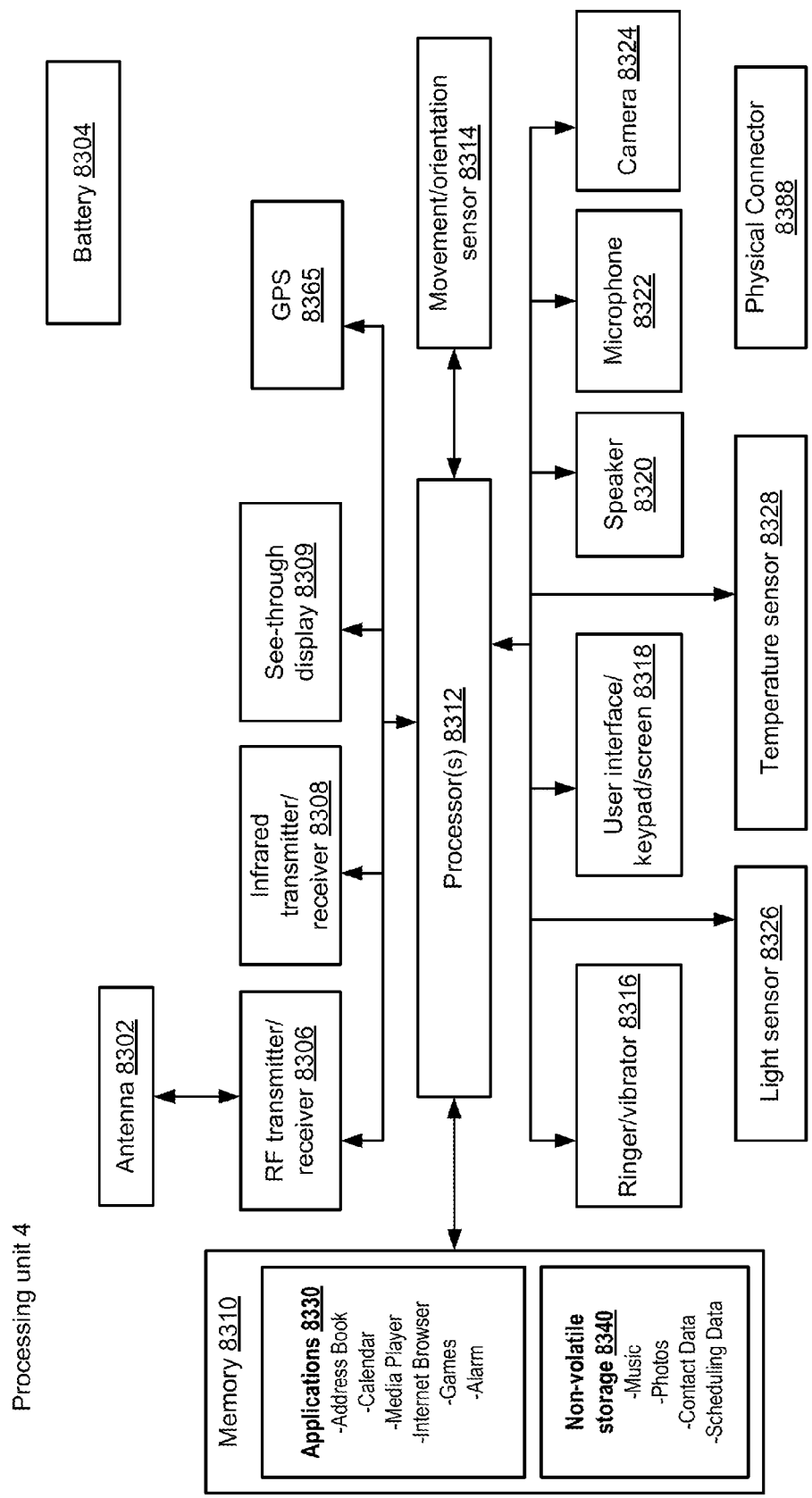
FIG. 6 is a block diagram depicting one embodiment of a mobile device configured to perform the disclosed technology.

FIG. 6 is a block diagram of one embodiment of processing unit 4 configured to perform the disclosed technology. Whereas in FIG. 3B, processing unit 4 is depicted as a wrist-mounted device, embodiments of processing unit 4 may include, pocket computers, mobile phones, personal digital assistants, and handheld media devices that have been integrated with wireless receiver/transmitter technology.

Processing unit 4 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of processing unit 4 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a microelectromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. By way of example, camera 8324 or light sensor 8326 may be configured to detect tags in the physical environment. Thus, in some embodiments, processing unit 4 may be configured to perform the disclosed technology without the need for head-mounted display device 2. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the processing unit 4 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

Figure 7:
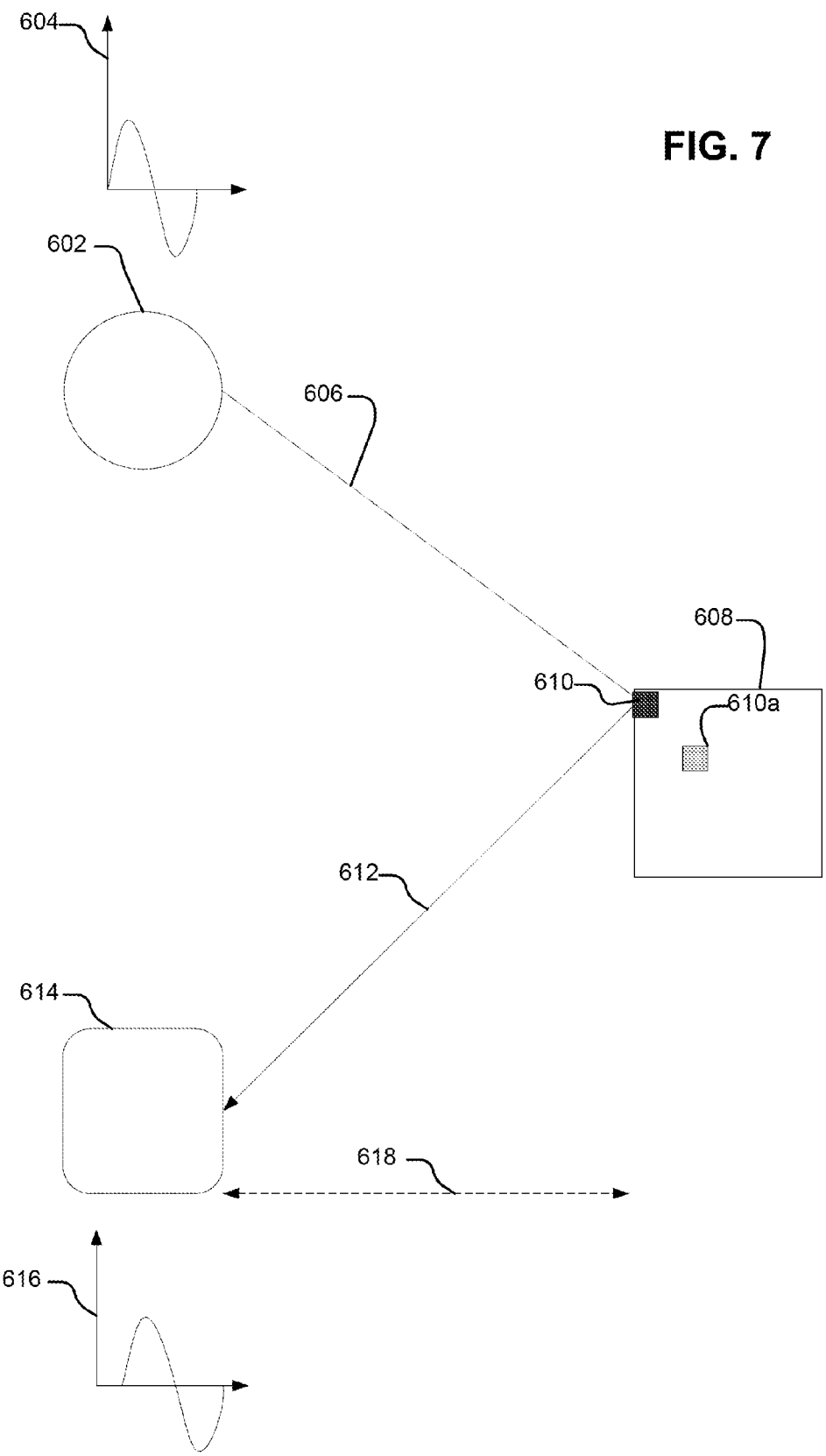
FIG. 7 is a diagram showing how a tag responds to incident light.

FIG. 7 is a diagram depicting the physical behavior of one embodiment of a tag. The various elements and distances in the diagram are presented for purposes of illustration only and are not drawn to scale. Element 602 is the source of a signal. In one embodiment, source 602 is IR light component 34 as illustrated in FIG. 5, and the signal is ray 606, comprising light of the infrared region of the electromagnetic spectrum. Graph 604 depicts the phase of the light wave at the point that it exits source 602. Ray 606 is incident upon region 610 of tag 608. In one embodiment, the surface of tag 608 on which region 610 lies faces source 602. In another embodiment, this surface is at an angle to source 602. Whereas tag 608 may be composed of a material such as plastic, region 610 may be composed of one or more of a class materials that can be deposited on the material of tag 608 and can introduce a specific phase shift to incident infrared light upon reflection. Regions on tag 608 such as regions 610 and 610a typically comprise individual units of a pattern of similar regions that together encode the data stored on the tag. In one embodiment, the system interprets the specific phase shift introduced by a region such as 610 as a symbol. In another embodiment, the system interprets the specific phase shift introduced by a region such as 610 as a binary code value of one or more bits of digital information.

Ray 612 is the reflection of infrared light ray 606. Comparing graph 616 with graph 604 indicates the phase shift (relative to that of ray 606 at source 602) introduced by region 610 of tag 608. This phase shift can be any amount and can vary with respect to regions other than region 610 on tag 608. By way of example only, region 610a on tag 608 may, if a ray of light were incident upon the region, introduce to the reflected ray a phase shift of 60 degrees with respect to the phase shift introduced by region 610 to ray 612. Ray 612 is received by sensor 614, which may or may not be physically connected to source 602. Having received ray 612 through sensor 614, as discussed above, the system is able to use the phase difference between rays 606 and 612 to determine the depth corresponding to region 610. In one embodiment, the system also calculates (using the speed of light, the delay between transmission and reception of the signal, and the distance between tag 608 and source 602) the distance between tag 608 and elements 602/614. The system can then use this information in order to identify a depth pattern (composed of regions such as 610 and 610a) on tag 608 within a 3D map of the environment of which tag 608 is a part. More detail about the nature of the depth pattern is provided below. In one embodiment, the system adjusts its depth measurement for attenuation in amplitude between rays 606 and 612, this attenuation occurring because of potential loss mechanisms such as absorption in region 610 or scattering in the air. Tag 608 is just one example of a tag that implements the disclosed technology; a tag may have many regions like region 610, and different regions may introduce different phase shifts to incident light.

Figure 8:
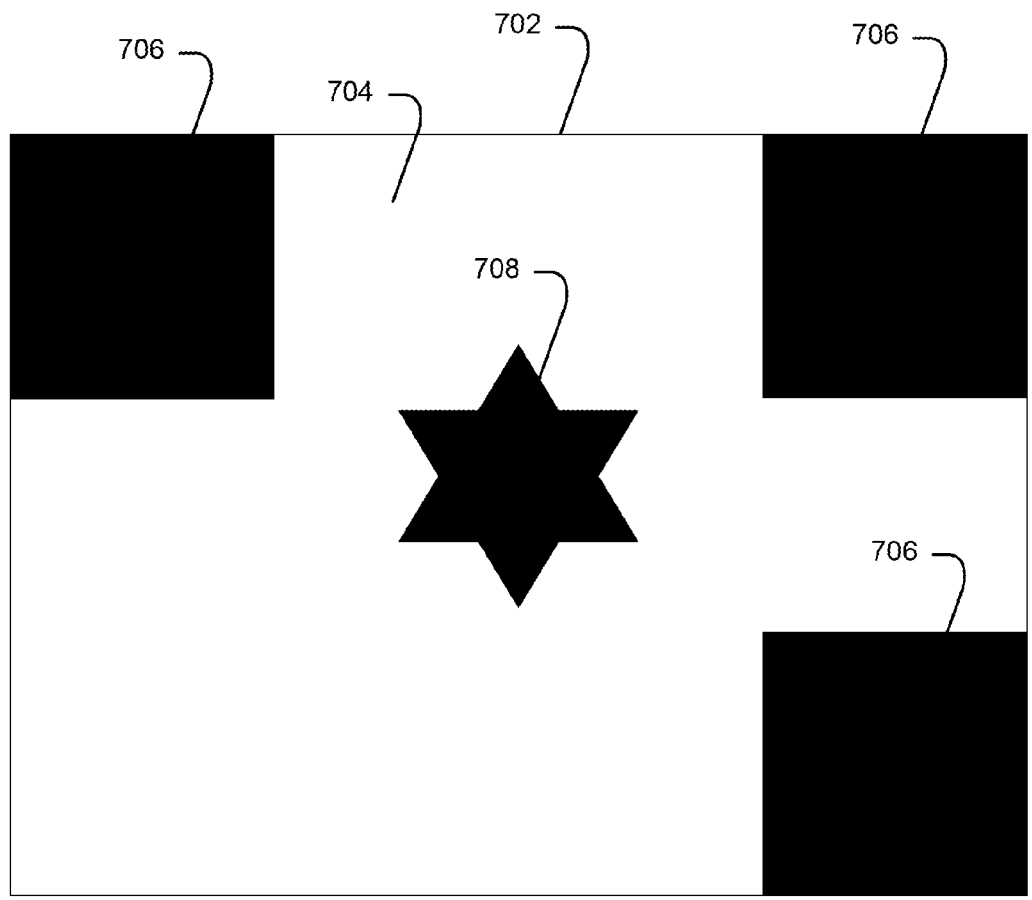
FIG. 8 shows one example of the patterned materials on a tag.

FIG. 8 depicts one example of a tag. This exemplary tag may be tag 608 as depicted in FIG. 7. The body of the exemplary tag is delimited by rectangle 702, but the body of a tag can take any shape. As shown by the white region (labeled 704) of the exemplary tag, most of the surface of the exemplary tag is "blank," that is, having no structure that encodes data. However, black regions 706 and 708 of the exemplary tag may, as with region 610 of FIG. 7, be composed of materials configured to introduce a specific phase shift to incident IR light, such as ray 606 of FIG. 7, upon reflecting this light, as shown by ray 612 of FIG. 7. While the patterns formed by black regions 706 and 708 of the exemplary tag take the shapes of squares and a star, respectively, patterns on a tag may take any shape at all. The pattern on a tag may be more or less intricate than that depicted in FIG. 8, as constrained by the method of manufacturing the tag and as required by the application of the tag. For example, the pattern on the tag may be as simple as alternating stripes as in a bar code, such that the pattern detected by the system is only two dimensions, the second dimension being depth. In some embodiments of the disclosed technology, tags are identified with or distinguished from each other by the pattern on their surfaces, so that all tags with the same patterns store the same data, and no tags with different patterns store the same data. The absence of a black square 706 in the lower left corner of the exemplary tag is one example of a feature that may appear in some tags, wherein an asymmetry in the pattern on a tag is deliberately introduced in order for the system detecting the tag to learn the orientation of the tag, which may be useful in decoding the pattern on the tag. However, there may be other ways of learning the orientation of a tag.

Figure 9:
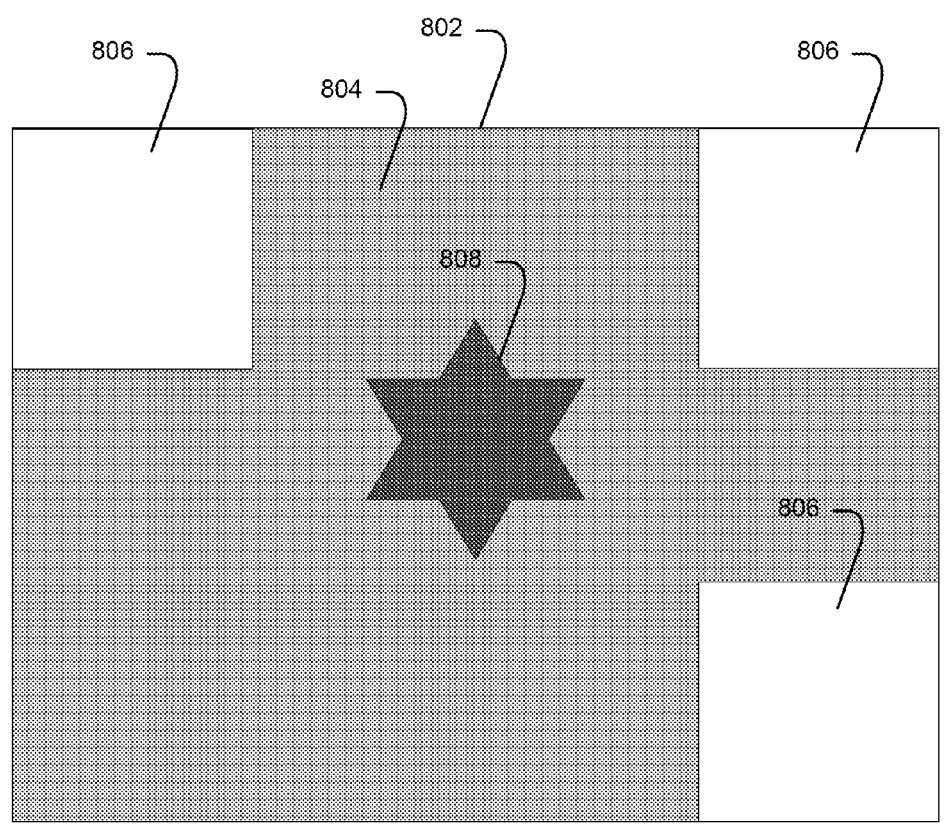
FIG. 9 shows one example of a depth map of a tag.

FIG. 9 depicts one example of a depth pattern detected from a tag. The tag depicted in FIG. 8 is the same as the exemplary tag depicted in FIG. 8. However, whereas FIG. 8 merely shows the geometry of the shapes that comprise the pattern on the exemplary tag, FIG. 9 shows how the pattern may be detected by a depth camera. As before, the tag is delimited by rectangle 802. As described in FIG. 7, the various regions of the pattern on the tag introduce certain phase shifts to incident IR light that they reflect, the phase shifts determined by the materials of which the corresponding regions are composed. By way of example only, the region inside dark gray star 808 introduces a phase shift of 45 degrees to incident IR light that it reflects, the regions inside white squares 806 introduce a phase shift of 90 degrees to incident IR light that they reflect, and the rest of the area (light gray, 804) of the tag introduces a phase shift of 0 degrees (i.e. no phase shift) to incident IR light that it reflects. By distinguishing the various regions of the pattern on the tag via the depth camera as just described, the system is able to discern the pattern on the tag and therefore decode the data stored in the pattern on the tag. According to the disclosed technology, regions on the tag that introduce phase shifts to reflected light may be very small, and may introduce phase shifts of any amount with respect to nearby regions.

FIG. 10A depicts one example scenario in which the disclosed technology may be used. The scenario shows user 19 inside a room (this scenario may also take place outdoors), looking at picture 1002. Adjacent to and below picture 1002 is tag 1004. As explained above, tag 1004 transparent, and therefore barely visible to user 19. Additionally, without head-mounted display device 2 and processing unit 4, user 19 cannot perceive any role played by tag 1004 in his visual environment. The role of tag 1004 will be explained in FIG. 10B.

FIG. 10B depicts one example scenario of the disclosed technology in use. FIG. 10B is largely the same as FIG. 10A, except that user 19 is equipped with head-mounted display device 2 and processing unit 4; the functionality of head-mounted display device 2 and processing unit 4 are as described above. As a result of being equipped with head-mounted display device 2 and processing unit 4, once head-mounted display device 2 and processing unit 4 detect tag 1004, user 19 is able to see the sign 1006 indicating the location of the "Fourth Coffee" coffee shop. In some embodiments, eyeglasses 2 and processing unit 4 are able to detect the presence and location of picture 1002, and is therefore able to position sign 1006 in order to avoid interfering with user 19's view of picture 1002. Additionally, if head-mounted display device 2 includes an RGB camera (as part of capture device 20), then in one embodiment, the system is able to use the color information captured about the surface on which sign 1006 will be displayed in order to adjust the color scheme of sign 1006 so that sign 1006 is clearly visible to user 19. Thus, if sign 1006 is to be projected on a red brick wall, then the letters and arrow of sign 1006 may appear to user 19 in bright yellow to offer sufficient contrast with the surroundings.

In the scenario of FIG. 10B, establishments other than the "Fourth Coffee" coffee shop may be nearby user 19's location. In one embodiment, upon detection, tag 1004 may show the same sign 1006 (depicting the "Fourth Coffee" sign with the arrow) to everyone with head-mounted display device 2 and processing unit 4 similar to those used by user 19. However, in another embodiment, the system is able to customize the content of the sign 1006 shown to users of head-mounted display device 2 and processing unit 4. For example, FIG. 2 shows one embodiment of head-mounted display device 2 enabled to perform the disclosed technology. As FIG. 2 shows, head-mounted display device 2 may be enabled to access large networks (180) such as the Internet. Using this internet access, the mobile device may be able to access the user's social network profile. From the social network profile, the mobile device may be able to glean the user's interests, and if the instructions read from the tag allow, decide the content of sign 1006 based on the information about the user's interests gleaned from the user's social network profile. Thus, while user 19 sees where to go to get coffee in sign 1006, another user whose social network profile expresses the user's interest in books might see where to find the nearest book store.

It should be noted that in applications involving the display of signs, the sign need not necessarily appear immediately after the system has detected and decoded one or more tags. Furthermore, the image need not necessarily be constantly visible once displayed. For example, suppose a tag includes a link that instructs the system to display a "Happy New Year" banner. In one embodiment, though the system has already detected and decoded the tag, the system will not display the banner until midnight of December 31$^{st}$, and only for the minute thereafter.

Figure 10C:
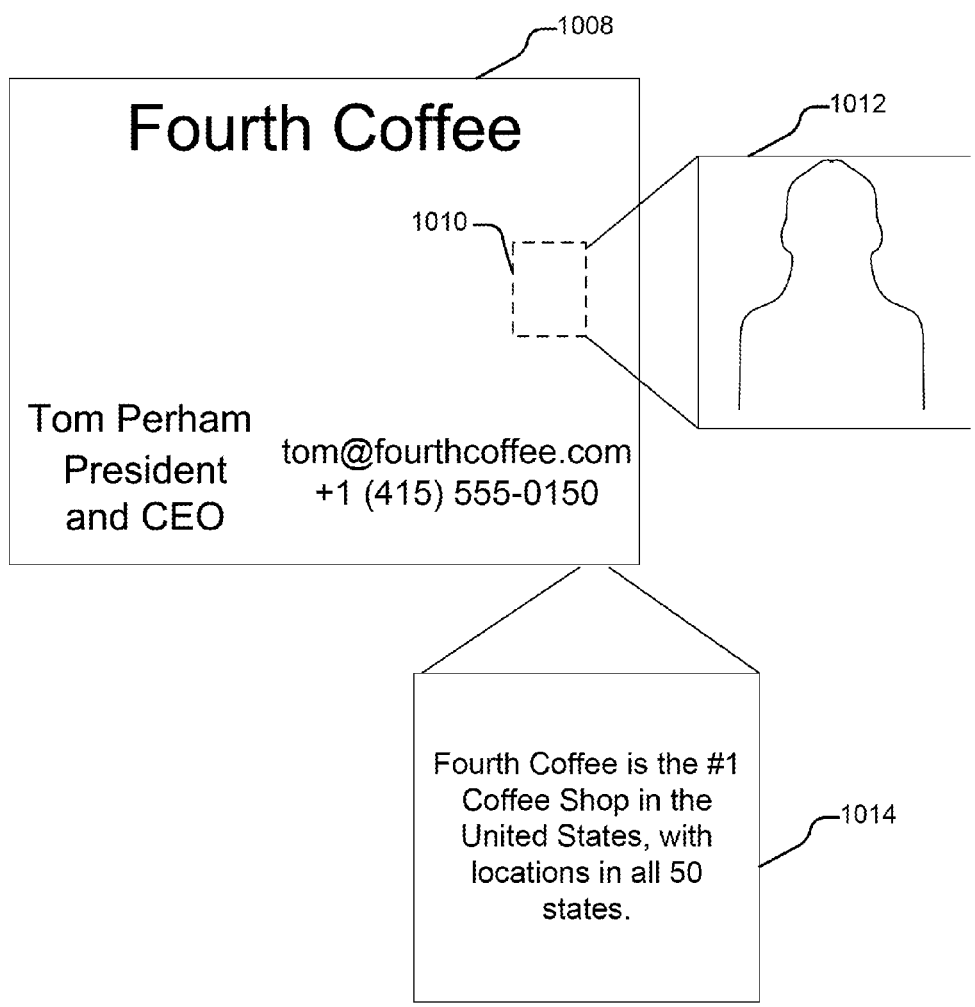

FIG. 10C depicts one example of the disclosed technology in use. Element 1008 is a business card. Element 1010 is a tag as described above, the dotted boundary indicating that the tag is not easy to see with the naked eye. Without user 19's head-mounted display device 2 and processing unit 4 from FIG. 10B (or equivalent), only business card 1008 is visible in the current scenario. However, if a viewer is equipped with head-mounted display device 2 and processing unit 4, then once head-mounted display device 2 and processing unit 4 have detected tag 1010 and processed the information contained therein, the viewer can also see elements 1012 and 1014 (in this example, an image of Tom Perham, who is named on the business card, and a brief description of the "Fourth Coffee" business, respectively) near business card 1008. Thus, one embodiment of the disclosed technology allows a user to see additional information pertaining to the content of a business card. This technology can be extended to other types of cards or documents.

Figure 10D:
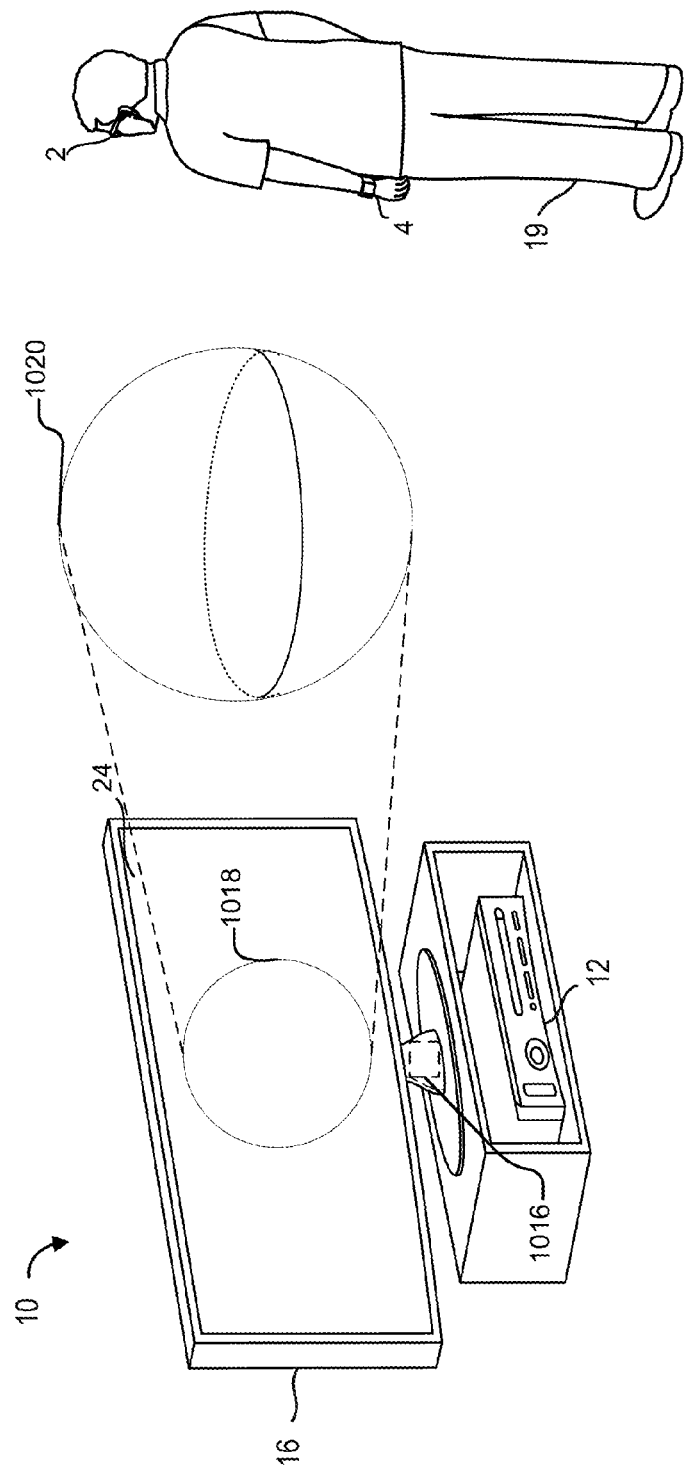

FIG. 10D depicts one example of the disclosed technology in use. User 19, as before, is equipped with head-mounted display device 2 and processing unit 4. User 19 is watching television 16, as part of entertainment system 10, in his living room. Gaming console 12 may or may not be active, and eyeglasses 2/processing unit may not be in communication with gaming console 12. A person in the same room as user 19 may be able to see element 1018, a 2-dimensional representation of a ball, on screen 24. However, without head-mounted display device 2 and processing unit 4 (or some equivalent), this person may not be able to see the 3D image 1020 of the same ball. The head-mounted display device 2 and processing unit 4 worn by user 19 is able to detect tag 1016 and associate tag 1016 with television 16, thus ensuring that user 19 sees a 3D version of the content being displayed on the screen, similar to that experienced when wearing 3D glasses and watching 3D-enabled content. In a further embodiment, if user 19's head-mounted display device 2 includes an RGB camera (as part of capture device 20), then this system, by observing the changes in frames on screen 24, is able to monitor the refresh rate of the TV display and track the motion of ball 1018 on the screen. The system can then constantly update the viewing location of ball 1020 so that it is always overlaid on the location of ball 10 on screen 24.

Suppose the screen of television 16 is off. In one embodiment, user 19's head-mounted display device 2 and processing unit 4 are able to detect that the screen of television 16 is off, but that tag 1016 is associated with television 16 by being physically proximate to television 16. Thus, head-mounted display device 2 may display streaming video for user 19 such that the video appears to be overlaid on the area of screen 24. The disclosed technology may therefore be able to simulate for a user the experience of watching television even when there is no active television set in sight. For example, user 19 may be able to see ball 1020 or ball 1018 on screen 24 even though another observer without head-mounted display device 2 and processing unit 4 is not be able to see anything on screen 24.

FIG. 10E depicts one example of the disclosed technology in use. In this example, user 19 is playing a video game, making use of gaming console 12 and television set 16, as parts of entertainment system 10. Cameras 20A and 20B, together with gaming console 12 (constituting a system), are able to capture user 19's motions and position and translate them into the motions and position of in-game character 19b. In one embodiment, the system is also able to detect tag 28b, chair 14b, and the fact that user 19 is standing on chair 14b. Since tag 28b is physically proximate to chair 14b, the system is able to associate tag 28b with chair 14b. The system then uses the information encoded in tag 28b to map chair 14b to in-game object mountain 14c, such that when user 19 stands on chair 14b, screen 24 shows character 19b standing on mountain 14c.

FIG. 10F illustrates an example scenario in which the disclosed technology is used. As in FIG. 1, two users, referred to as users 19 and 29, are playing an interactive video game.

In the example, users 19 and 29 are in a living room as indicated by the system 10 and chairs 14a and 14b. Each user is wearing a see-through, augmented reality display device system comprising, in this example, the head-mounted display device 2 as a pair of eyeglasses, as well as a processing unit 4 on the wrist. The display 24 is illustrated to show what each of users 19 and 20 is currently looking at through his respective glasses 2. A person who walks in the living room without the HMD may not see at least some information on these display views. Users 29 and 19 see through their display devices images corresponding to events in the game they are playing. Cameras 20A and 20B operate as capture devices in order to capture information about the physical environment, including users 19 and 29, physical features of the room, and any tags that may be present within the field of view of the cameras.

Additionally, users 19 and 29 are at a range or distance 34 from each other. As discussed below, a distance between users may be a parameter used to determine the location of displayed images corresponding to virtual objects created or obtained by the augmented reality system. In this example, an example of a distance or range is shown by dashed line 35. In other words, if using wireless transceivers for detecting being within a distance based on detected wireless signals, the distance between users 19 and 29's wireless transceivers, e.g. wireless communication components 346, are to be within distance 35.

Visible to both users 19 and 29 is monster 22, a virtual object in the game they are playing. In this example, monster 22 is not visible to others who do not have an HMD configured to view the content available to users 19 and 29. In this example, the position of monster 22 is determined by tag 18, which is placed on picture 28. Monster 22 may be generated when tag 18 is detected by the HMD worn by users 19 and/or 29. However, in some embodiments, the augmented reality system may generate an image/animation of monster 22, along with the corresponding ability to interact with monster 22, only upon certain triggers, such as in-game events or actions performed by users 19 and/or 29. While in this example, monster 22 is positioned below tag 18, in other embodiments, monster 22 may be placed in another location in the room, with or without regard to the location of tag 18. As mentioned in the previous paragraph, the distance 34 between users 19 and 29 may be used as a parameter in determining the location of images such as monster 22.

Though, for the purpose of the drawing, monster 22 is depicted as a stationary image, in some embodiments, monster 22 may instead be an animated image. In some embodiments, if entertainment system 10 is equipped with surround sound, then the system may exploit the directionality of the speakers to play audio corresponding to monster 22 (e.g. roaring) that seem to users 19 and 29 to be coming from monster 22. Furthermore, users 19 and 29 may be able to interact with monster 22. For example, if the system detects user 19 or 29 advancing toward the location where monster 22 is displayed, then the system may show users 19 and 29 an animation of monster 22 running away.

Additionally, if there are other tags within range of the system's capture devices, then in one embodiment, the system is able to display the virtual objects associated with these other tags as well. For example, if the system can detect multiple tags that exhibit the same pattern as tag 28, then the system may display, in various locations, multiple monsters identical to monster 22. In another embodiment, the system, upon detecting multiple tags, may display virtual objects that accounts for the combined data from some subset of the multiple tags. Referring to the scenario depicted in FIG. 10F, if the system detects multiple tags that exhibit the same pattern as tag 28, then in one embodiment, the system enlarges the image of monster 22, or increases some in-game parameter of the monster such as hit points. In a further embodiment, these increases may be proportional to the number of detected tags that exhibit the same pattern as tag 28. Thus, users 19 and 29 may vary the number of tags (with the same pattern as tag 28) within the field of view of the system in order to vary their gaming experience. In another example, suppose that if the system only detects tag A, then the system will display a stationary cat. Further suppose that if the system only detects tag B, then the system will display a stationary dog. In one embodiment, if the system detects both tags A and B, then the system will display the dog chasing the cat, as opposed to just the stationary dog and the stationary cat.

Figure 11:
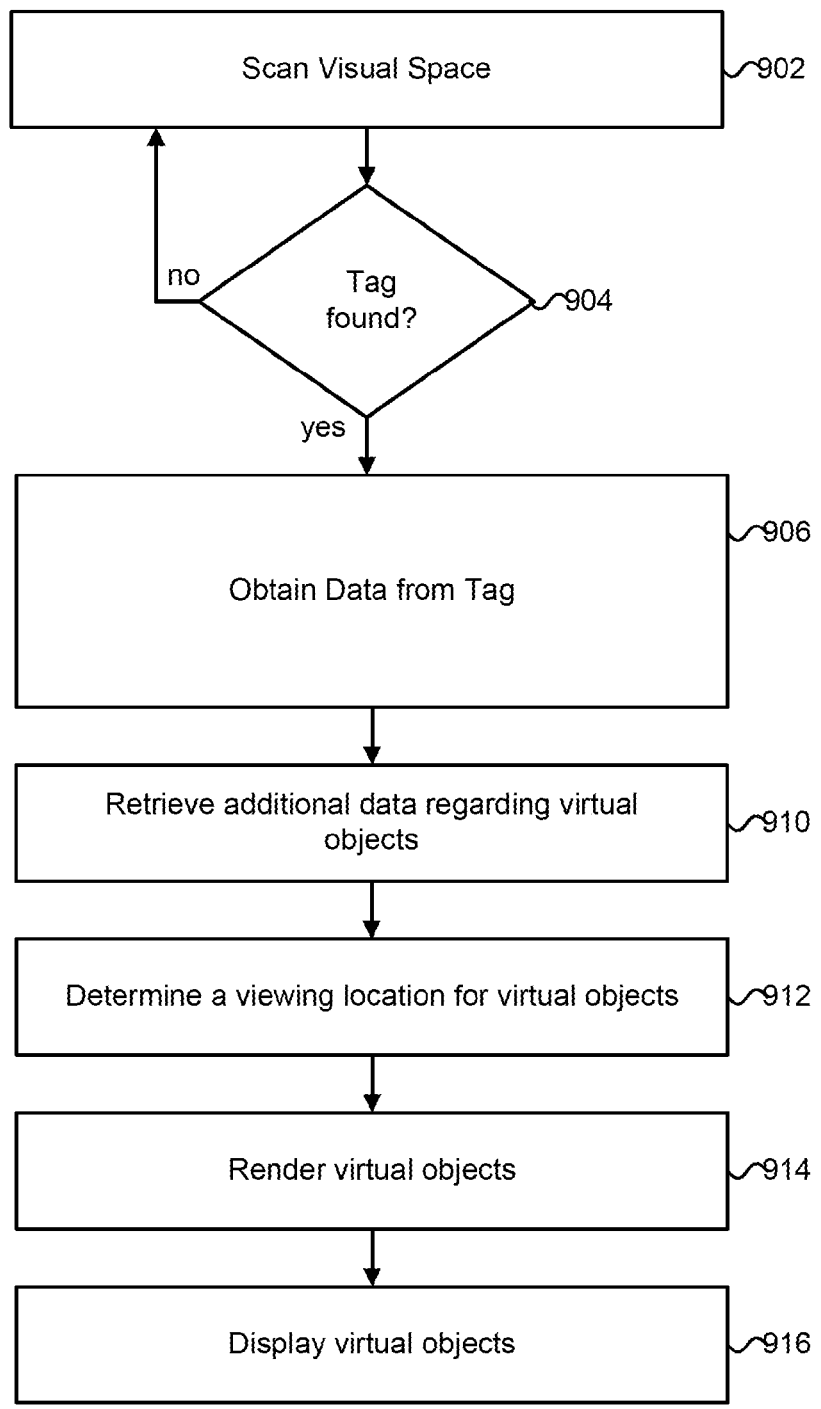
FIG. 11 is a flow chart depicting one embodiment of a process by which the system detects and responds to a tag.

FIG. 11 is a flow chart describing one embodiment of a process for detecting and responding to a tag (such as that depicted in FIGS. 7-9) in the physical environment in order to generate a virtual object. Embodiments of the process of FIG. 11 may be adapted to the various use cases shown in FIGS. 10A-E. In one embodiment, the process of FIG. 11 is performed by a mobile device, such as head-mounted display device 2 in FIG. 2.

In step 902, the system scans the space within the field of view of one or more capture devices, such as capture device 20 in FIG. 5. The information scanned from the visual space may comprise optical and depth data, depending on the configuration of the capture devices. In step 904, the system determines whether there is a tag within field of view of the capture devices. In one embodiment, one or more processors such as processor 146, parses the information captured in step 902 in order to detect depth patterns characteristic of one or more tags. If no tags are found, then the system returns to step 902 to continue scanning the physical environment until a tag is found. If one or more tags are found, then the system obtains data from these tags. In one embodiment, the system's processors decode the depth patterns detected on the one or more tags into a suitable format. In some embodiments, the data encoded on tags includes reference information to data in a data repository, which contains additional data regarding one or more virtual objects. The additional data regarding the virtual objects may include instructions on how to display these virtual objects with respect to objects or features of the physical environment. In step 910, the system retrieves this additional data from the repository. In one embodiment, the system uses a device such as network interface 145 in order to retrieve this data from server 15 or some alternative data repository. In one embodiment, the system checks a local storage device, such as memory 147, to determine whether it already has the data regarding the virtual objects referred to by the tag, since the system may have already stored this data locally or downloaded this data previously, and loading the data again may result in unnecessary delay. The data retrieved in step 910 may comprise one or more definitions for virtual objects as well as rendering locations corresponding to virtual objects. Once the system has acquired the data regarding the virtual objects, in step 912, the system determines a viewing location for any virtual objects. The virtual objects may include still images, video, and/or audio. Whether the viewing location of the virtual objects is in a head-mounted display device such as 2 or a display such as 24, the viewing location is determined with respect to some feature or object of the physical environment, such that this feature or object is also represented in the display device through which the virtual objects are viewed. In one embodiment, the system performs step 912 with one or more processors. More detail regarding the determining of the viewing location for the virtual objects will be provided in FIG. 12. Once the system has determined a viewing location for the virtual objects, the system renders these virtual objects in step 914. In one embodiment, the system performs step 914 with one or more processors. In one embodiment, the order of steps 912 and 914 is reversed. Once the viewing locations of the virtual objects (referred to by the tags) have been determined, and these virtual objects have been rendered, in step 916, the system displays the virtual objects in the determined viewing locations for the viewers.

Figure 12A:
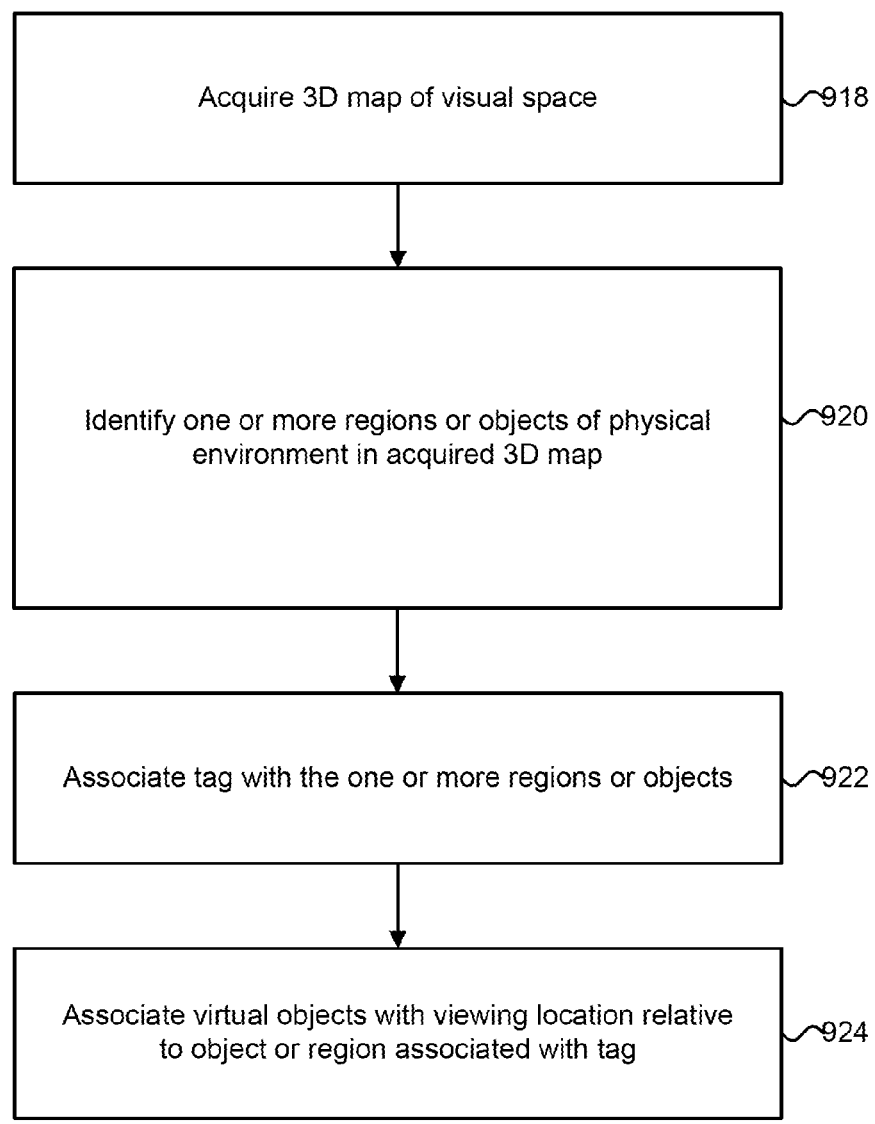
FIGS. 12A-B are flow charts depicting embodiments of a process by which the system determines a viewing location for virtual objects and/or information.

FIG. 12A is a flow chart describing one embodiment of a method wherein the system determines the viewing location of virtual objects. FIG. 12A provides more detail regarding step 912 of FIG. 11.

In step 918, the system acquires a 3-dimensional map of the space within the field of view of the capture devices. In one embodiment, the system is able to determine the depth, or relative distance, of various points in the visual field of a depth camera (as part of capture device 20). In one embodiment, the system, if equipped with an RGB camera, is also able to assign a color value to the points in its visual field. In step 920, the system identifies one or more object or regions of the physical environment in the 3-dimensional map acquired in step 918 using any of the various image detection, object recognition, edge detection, and related techniques known in the art. In one embodiment, the objects or regions thus identified the 3-dimensional map correspond to real-world objects, such as chairs, people, pictures, and television screens, as described in the various examples in FIG. 10. In one embodiment, the system performs steps 918 and 920 during step 902 of FIG. 11, while scanning the physical environment.

In step 922, the system associates the tags found in step 904 of FIG. 11 with the objects or regions obtained in step 920. In one embodiment, the system associates the tags with objects which the tag is physically near, such as picture 1002 in FIGS. 10A-10B. In another embodiment, the system may follow the instructions obtained in step 910 of FIG. 11 to associate the virtual objects with regions or objects to which the tag is not necessarily near. For example, on Saint Patrick's Day, a tag on a barroom wall may instruct the system to paste a virtual (that is, visible only to AR) "Pinch Me" sign on the shirt of every person who is not wearing a green shirt, whether or not the people so designated are near the wall with the tag or even inside the bar. For this example, in step 922, the system has associated the tag with people within the field of view of capture devices who are not wearing green shirts.

In step 924, the system associates the virtual objects corresponding to the virtual objects (referred to by the tags) with a viewing location relative to the objects or regions associated with the tags in step 922. Thus, in FIG. 10B, the system has determined that sign 1006 must be displayed away from picture 1002 in order to avoid obscuring user 19's view of picture 1002 or compromise the legibility of sign 1006. Alternatively, in FIG. 10D, since tag 1016 is associated with television 16, the system determines the viewing location of ball 1020 so that ball 1020 appears as if it is emerging from screen 24.

Figure 12B:
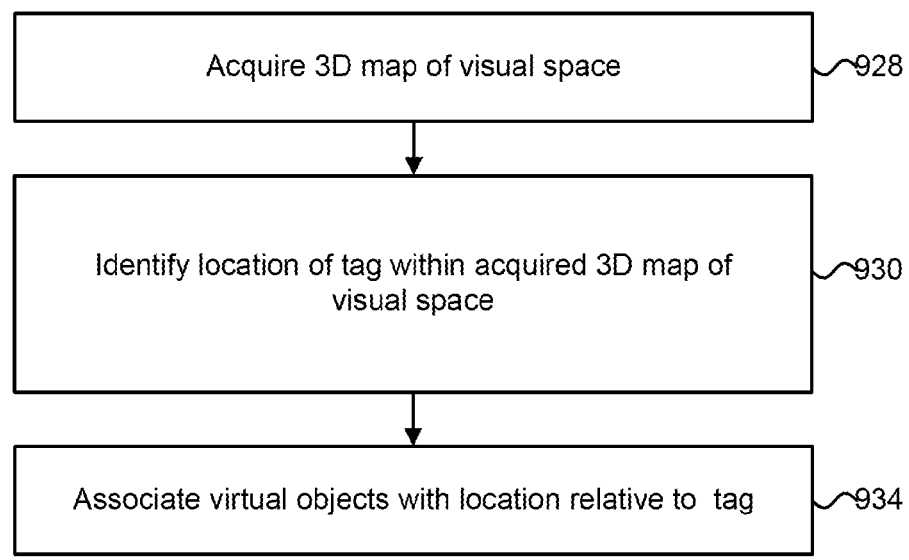

FIG. 12B is a flow chart describing one embodiment of a method wherein the system determines the viewing location of virtual objects. FIG. 12B provides more detail regarding step 912 of FIG. 11.

As in step 918 of FIG. 12A, in step 928, the system acquires a 3-dimensional map of the physical environment that the system can detect with capture devices such as a depth camera. In step 930, the system identifies the location of the tags within the 3-dimensional map acquired in step 928 without necessarily any reference to any partitioning of this 3-dimensional map. In step 934, the system associates the virtual objects to a location in the 3-dimensional map relative to the location of the tag. Thus, in FIG. 10F, the system has determined that monster 22 should be displayed a few feet below tag 18.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a virtual object on a display device, the method comprising:
   scanning a physical environment;
   detecting a physical tag associated with a physical object in the physical environment;
   obtaining data relating to display of the virtual object from the detecting of the physical tag; and
   rendering the virtual object on the display device as at least a partial overlay to the physical object.

2. The method of claim 1, wherein the physical tag comprises a depth pattern reflected in a phase shift between regions, the method further comprising decoding the depth pattern to obtain the data relating to the display of the virtual object.

3. The method of claim 1, wherein the rendering of the virtual object comprises adjusting colors of the virtual object to improve visibility of the virtual object against a viewing location.

4. The method of claim 1, wherein the rendering of virtual object comprises displaying the virtual object in accordance with user interactions.

5. The method of claim 1, further comprising determining a rendering location for the virtual object relative to an image of the physical environment.

6. The method of claim 5, wherein the determining the rendering location comprises:
   acquiring a three-dimensional map of the physical environment;
   identifying one or more regions in the acquired three-dimensional map;
   associating the physical tag with the one or more regions; and
   associating the virtual object corresponding to the physical tag with the rendering location relative to the one or more regions.

7. The method of claim 6, wherein the one or more regions comprise one or more objects in the physical environment.

8. The method of claim 5, wherein the determining the rendering location comprises:
   acquiring a three-dimensional map of the physical environment;
   identifying a location of the physical tag within the acquired three-dimensional map;
   associating the virtual object corresponding to the physical tag with the rendering location relative to the location of the physical tag.

9. The method of claim 6, wherein the rendering location comprises a location relative to a location of the physical tag.

10. The method of claim 6, wherein the rendering location comprises a location relative to a feature of the physical environment.

11. The method of claim 1, wherein the rendering of the virtual object on the display device as at least the partial overlay to the physical object comprises rendering the virtual object within a predefined area of the physical object.

12. The method of claim 1, further comprising:
    accessing a user profile that includes user interests; and
    selecting content for the virtual object based at least in part on the user interests.

13. A method implemented by a processor and a depth sensing capture device, comprising
    scanning a physical environment using the depth sensing capture device;
    detecting, in the physical environment, a static tag associated with a physical object, the static tag including a transparent physical surface, and a visually imperceptible depth pattern constructed in the transparent physical surface, the visually imperceptible depth pattern encoding data related to a display of a virtual object;
    obtaining the data related to the display of the virtual object based on the detecting of the static tag;
    retrieving a virtual object definition associated with the virtual object; and
    rendering, based at least in part on the virtual object definition, the virtual object on a display device as at least a partial overlay to the physical object.

14. The method of claim 13, wherein the static tag is attached to one or more surfaces in the physical environment.

15. The method of claim 13, wherein the detecting includes detecting the visually imperceptible depth pattern by determining a phase shift to electromagnetic waves reflected by materials.

16. The method of claim 13, wherein the rendering the virtual object includes determining a rendering location by:
   acquiring a three-dimensional map of the physical environment;
   identifying one or more regions in the acquired three-dimensional map;
   associating the static tag with the one or more regions; and
   associating the virtual object with the rendering location relative to the one or more regions associated with the static tag.

17. The method of claim 13 wherein the rendering the virtual object includes determining a rendering location by:
   acquiring a three-dimensional map of the physical environment;
   identifying a location of the static tag within the acquired three-dimensional map;
   associating the virtual object with the rendering location relative to the location of the static tag.

18. A device comprising:
   a display;
   a processor; and
   memory storing instructions that, when executed by the processor, cause the device to perform operations comprising:
     scanning a physical environment;
     detecting a physical tag associated with a physical object in the physical environment;
     obtaining, from the physical tag, data describing a display of a virtual object; and
     rendering the virtual object on the display as at least a partial overlay to the physical object based at least in part on the obtained data.

19. The device of claim 18, wherein the rendering of the virtual object on the display as at least the partial overlay to the physical object comprises rendering the virtual object within a predefined area of the physical object.

20. The device of claim 18, wherein the operations further comprise:
   accessing a user profile that includes user interests; and
   selecting content for the virtual object based at least in part on the user interests.

* * * * *